(12) United States Patent
Liu et al.

(10) Patent No.: US 8,630,221 B2
(45) Date of Patent: Jan. 14, 2014

(54) DONOR EVOLVED NODEB, RELAY NODE AND COMMUNICATION METHOD THEREOF

(75) Inventors: Shu-Tsz Liu, Taipei (TW); Kanchei Loa, Taipei (TW)

(73) Assignee: Institute for Information Industry, Taipei (TW)

(*) Notice: Subject to any disclaimer, the term of this patent is extended or adjusted under 35 U.S.C. 154(b) by 356 days.

(21) Appl. No.: 12/915,765

(22) Filed: Oct. 29, 2010

(65) Prior Publication Data

US 2011/0103294 A1 May 5, 2011

Related U.S. Application Data

(60) Provisional application No. 61/256,698, filed on Oct. 30, 2009.

(51) Int. Cl.
 *H04B 7/14* (2006.01)
(52) U.S. Cl.
 USPC .......................................... 370/315; 370/327
(58) Field of Classification Search
 USPC .................................................. 370/315, 327
 See application file for complete search history.

(56) References Cited

U.S. PATENT DOCUMENTS

| | | | | |
|---|---|---|---|---|
| 5,768,256 | A * | 6/1998 | Allen et al. | 370/218 |
| 6,668,175 | B1 * | 12/2003 | Almgren et al. | 455/522 |
| 7,580,387 | B2 * | 8/2009 | Kayama et al. | 370/329 |
| 2007/0091900 | A1 * | 4/2007 | Asthana et al. | 370/395.42 |
| 2009/0225711 | A1 * | 9/2009 | Sammour et al. | 370/329 |
| 2010/0046418 | A1 * | 2/2010 | Horn et al. | 370/315 |
| 2010/0103865 | A1 * | 4/2010 | Ulupinar et al. | 370/315 |
| 2010/0260096 | A1 * | 10/2010 | Ulupinar et al. | 370/315 |
| 2010/0260129 | A1 * | 10/2010 | Ulupinar et al. | 370/329 |
| 2010/0316096 | A1 * | 12/2010 | Adjakple et al. | 375/211 |
| 2010/0322148 | A1 * | 12/2010 | Liu et al. | 370/315 |
| 2010/0322151 | A1 * | 12/2010 | Racz et al. | 370/328 |
| 2010/0322197 | A1 * | 12/2010 | Adjakple et al. | 370/332 |
| 2011/0002304 | A1 * | 1/2011 | Lee et al. | 370/331 |
| 2011/0075684 | A1 * | 3/2011 | Zeng et al. | 370/475 |
| 2011/0080890 | A1 * | 4/2011 | Cai et al. | 370/331 |
| 2011/0080892 | A1 * | 4/2011 | Cai et al. | 370/331 |
| 2011/0085471 | A1 * | 4/2011 | Zhang | 370/254 |

(Continued)

FOREIGN PATENT DOCUMENTS

EP   2 259 651   8/2010

OTHER PUBLICATIONS

Search Report rendered by the European Patent Office (EPO) to EP patent application 10189260.2, which is an EP counterpart application corresponding to the present US application, Jun. 21, 2011, 9 pages.

(Continued)

*Primary Examiner* — John Blanton
*Assistant Examiner* — Jay P Patel
(74) *Attorney, Agent, or Firm* — Skaar Ulbrich Macari, P.A.

(57) ABSTRACT

A relay node, a donor evolved NodeB (DeNB) and a communication method thereof for use in a long term evolution (LTE) network are provided. The LTE network comprises the relay node and the DeNB. In the present LTE network of the present invention, at least two bearers can be set up between the relay node and the DeNB so that signaling messages can be transmitted between the relay node and the DeNB based on different priorities.

26 Claims, 20 Drawing Sheets

(56) References Cited

U.S. PATENT DOCUMENTS

| | | | |
|---|---|---|---|
| 2011/0103291 A1* | 5/2011 | Wiberg et al. | 370/315 |
| 2011/0141959 A1* | 6/2011 | Damnjanovic et al. | 370/311 |
| 2012/0008601 A1* | 1/2012 | Zisimopoulos et al. | 370/336 |
| 2012/0028631 A1* | 2/2012 | Chun et al. | 455/422.1 |
| 2012/0082088 A1* | 4/2012 | Dalsgaard et al. | 370/315 |
| 2012/0127863 A1* | 5/2012 | Yi et al. | 370/235 |

OTHER PUBLICATIONS

3rd Generation Partnership Project; Technical Specification Group Radio Access Network; Evolved Universal Terrestrial Radio Access (E-UTRA); Relay architecture for E-UTRA (LTE-Advanced)(Release 9); Valbonne, France; Sep. 2009, 20 pages.

Email Discussion Rapporteur NTT Docomo et al: Report of email discussion [66#22] on Relay architecture, Los Angeles, CA; Jun. 29, 2009, 30 pages.

Ericsson: Addressing on S1-C and X2-C, St. Louis, MO; Feb. 12, 2007, 4 pages.

Institute for Information Industry (III) et al: Investigating head-of-line blocking issue among four relay alternatives; Jeju, Korea; Nov. 9, 2009, 9 pages.

CATT: Number of Data Bearers on Un; Montreal, Canada; May 10, 2010, 6 pages.

\* cited by examiner

DONOR EVOLVED NODEB, RELAY NODE AND COMMUNICATION METHOD THEREOF

PRIORITY

This application claims the benefit of U.S. Provisional Application Ser. No. 61/256,698 filed on Oct. 30, 2009, which is hereby incorporated by reference herein in its entirety.

FIELD

The present invention relates to a donor evolved NodeB, a relay node and a communication method thereof. More particularly, the donor evolved NodeB, the relay node and the communication method thereof of the present invention, which are for use in a long term evolution network, employ at least two bearers between the donor evolved NodeB and the relay node for transmitting signaling messages based on different priorities.

BACKGROUND

Wireless network technologies are commonly and widely used nowadays. In order to provide different quality of services in different environments, various network protocols are developed. One of the popular networks is the long term evolution (LTE) network.

Particularly, the main reason why the LTE network could become popular is because the LTE network has the advantages of higher transmitting speed, wider coverage range, and the most important, lower costs. However, in the LTE network, the hardware modules, protocols and communicating procedures are not efficient since the LTE network is still being developed. One of the issues is the Head-of-Line blocking (HOL) problem during the transmissions.

Please refer to FIG. 1A which depicts a current LTE network 1 without relay nodes. The LTE network 1 comprises a donor evolved NodeB (DeNB) 13 and a core network 15. The DeNB 13 connects with the core network 15 via a stream control transmission protocol (SCTP) association 14 which includes two streams 14a and 14b. Specifically, in the scenario depicted in the current LTE network 1 in FIG. 1A, the DeNB 13 is transmitting signaling message H1, H2, (the messages with higher priorities) L1 and L2 (the messages with lower priorities) to the core network 15. It is clear that, based on the SCTP association 14, the signaling messages H1 and H2 can be transmitted via the stream 14a and the signaling messages L1 and L2 can be transmitted via the stream 14b. Accordingly, the signaling messages H1, H2, L1 and L2 between the DeNB 13 and the core network 15 can be transmitted separately by the different priorities.

However, please refer to FIG. 1B which depicts the current LTE network 1 with a relay node 11. When the LTE network 1 employs the relay node 11, the HOL problem occurs. Specifically, in the scenario depicted in the LTE network 1 with the relay node 11 in FIG. 1B, the relay node 11 is transmitting signaling messages H3, H4 (the messages with higher priorities), L3 and L4 (the messages with lower priorities) to the DeNB 13. However, even if the signaling messages are labeled in different priorities by the relay node 11, the signaling messages with higher priorities (e.g., H3 and H4) still have great chances to be blocked by the signaling messages with lower priorities (e.g., L1 and L2) since there is only one bearer 12 which includes only one stream 12a for transmitting messages between the relay node 11 and the DeNB 13.

Accordingly, the signaling messages H3, H4, L3 and L4 from the DeNB 13 to the core network 15 would be transmitted as the same as the order from the relay node 11 to the DeNB 13 even if there are two streams 14a and 14b between the DeNB 13 and the core network 15. Therefore, the blocking problem exists between the DeNB 13 and the core network 15 due to the earlier blocking problem happened between the relay node 11 and the DeNB 13.

As described above, the efficiency of the signaling message transmission is very poor in the current LTE network. Therefore, a mechanism and method for solving the blocking problems described above is needed.

SUMMARY

An objective of certain embodiments of the invention is to provide a communication method for a relay node. The relay node is adapted for use in a long-term evolution (LTE) network. The LTE network comprises the relay node and a donor evolved NodeB (DeNB). The relay node connects with the DeNB wirelessly. The communicating method comprises the following steps of: (a) enabling the relay node to set up at least two bearers with the DeNB, wherein the at least two bearers comprise a first bearer and a second bearer; (b) enabling the relay node to transmit a first uplink signaling message with first uplink priority to the DeNB via the first bearer and to transmit a second uplink signaling message with second uplink priority to the DeNB via the second bearer; and (c) enabling the relay node to receive a first downlink signaling message with first downlink priority from the DeNB via the first bearer and to receive a second downlink signaling message with second downlink priority from the DeNB via the second bearer.

Another objective of certain embodiments of the invention is to provide a relay node for use in a long-term evolution (LTE) network. The LTE network comprises the relay node and a donor evolved NodeB (DeNB). The relay node connects with the DeNB wirelessly. The relay node comprises a processing unit and a transceiver. The processing unit is configured to set up at least two bearers with the DeNB. The at least two bearers comprise a first bearer and a second bearer. The transceiver is configured transmit a first uplink signaling message with first uplink priority to the DeNB via the first bearer, to transmit a second uplink signaling message with second uplink priority to the DeNB via the second bearer, to receive a first downlink singling message with first downlink priority from the DeNB via the first bearer, and to receive a second downlink signaling message with second downlink priority from the DeNB via the second bearer.

Yet a further objective of certain embodiments of the invention is to provide a communication method for a donor evolved NodeB (DeNB). The DeNB is adapted for use in a long-term evolution (LTE) network. The LTE network comprises a relay node and the DeNB. The relay node connects with the DeNB wirelessly. The communicating method comprises the following steps of: (a) enabling the DeNB to set up at least two bearers with the relay node, wherein the at least two bearers comprise a first bearer and a second bearer; (b) enabling the DeNB to receive a first uplink signaling message with first uplink priority from the relay node via the first bearer and to receive a second uplink signaling message with second uplink priority from the relay node via the second bearer; and (c) enabling the DeNB to transmit a first downlink signaling message with first downlink priority to the relay node via the first bearer and to transmit a second downlink signaling message with second downlink priority to the relay node via the second bearer.

Yet a further objective of certain embodiments of the invention is to provide a donor evolved NodeB (DeNB) for use in a long-term evolution (LTE) network. The LTE network comprises a relay node and the DeNB. The relay node connects with the DeNB wirelessly. The DeNB comprises a processing unit and a transceiver. The processing unit is configured to set up at least two bearers with the relay node. The at least two bearers comprise a first bearer and a second bearer. The transceiver is configured to receive a first uplink signaling message with first uplink priority from the relay node via the first bearer, to receive a second uplink signaling message with second uplink priority from the relay node via the second bearer, to transmit a first downlink signaling message with first downlink priority to the relay node via the first bearer; and to transmit a second downlink signaling message with second downlink priority to the relay node via the second bearer.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these embodiments are not intended to limit the present invention to any specific environment, example, embodiment, applications, or particular implementations described in these embodiments. Therefore, descriptions of these example embodiments are only provided for purpose of illustration but not to limit the present invention. It should be appreciated that elements unrelated directly to the present invention are omitted from the embodiments and the attached drawings.

Figure 1A:
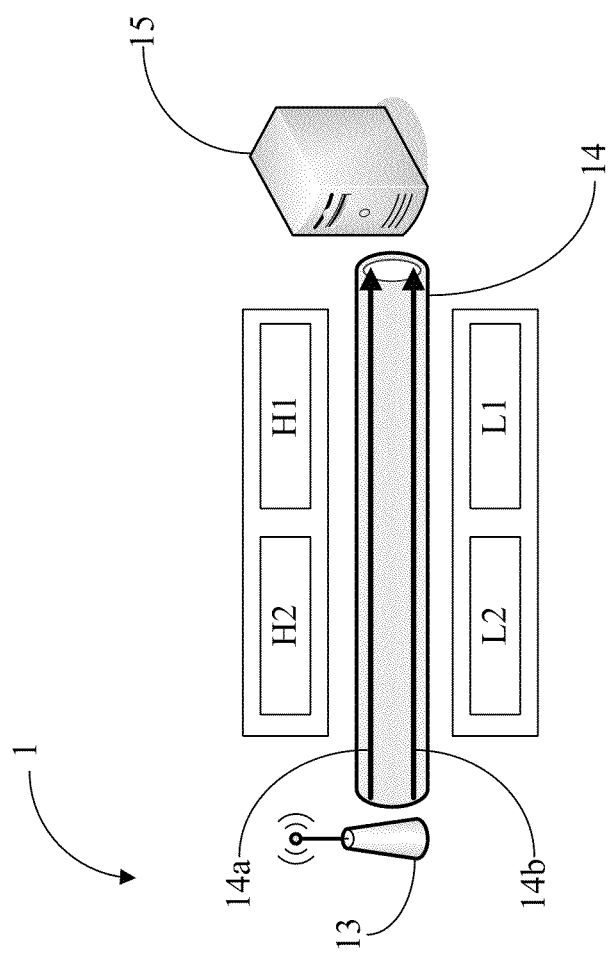
FIGS. 1A-1B illustrate a current LTE network of prior art.
Figure 1B:
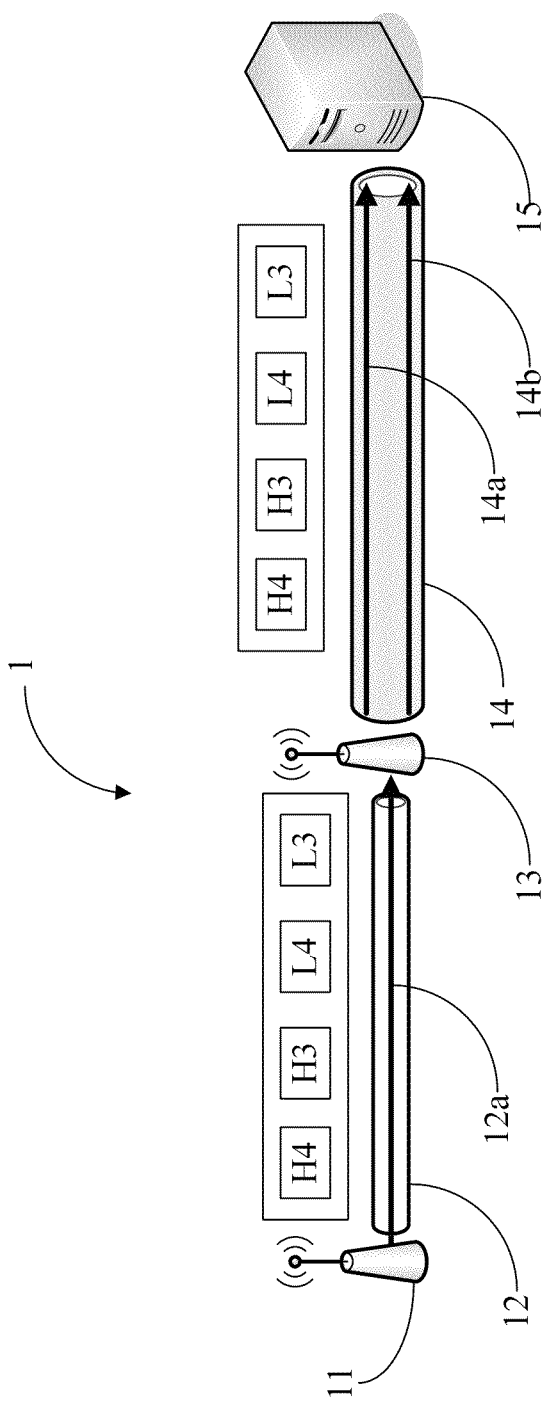
Figure 2A:
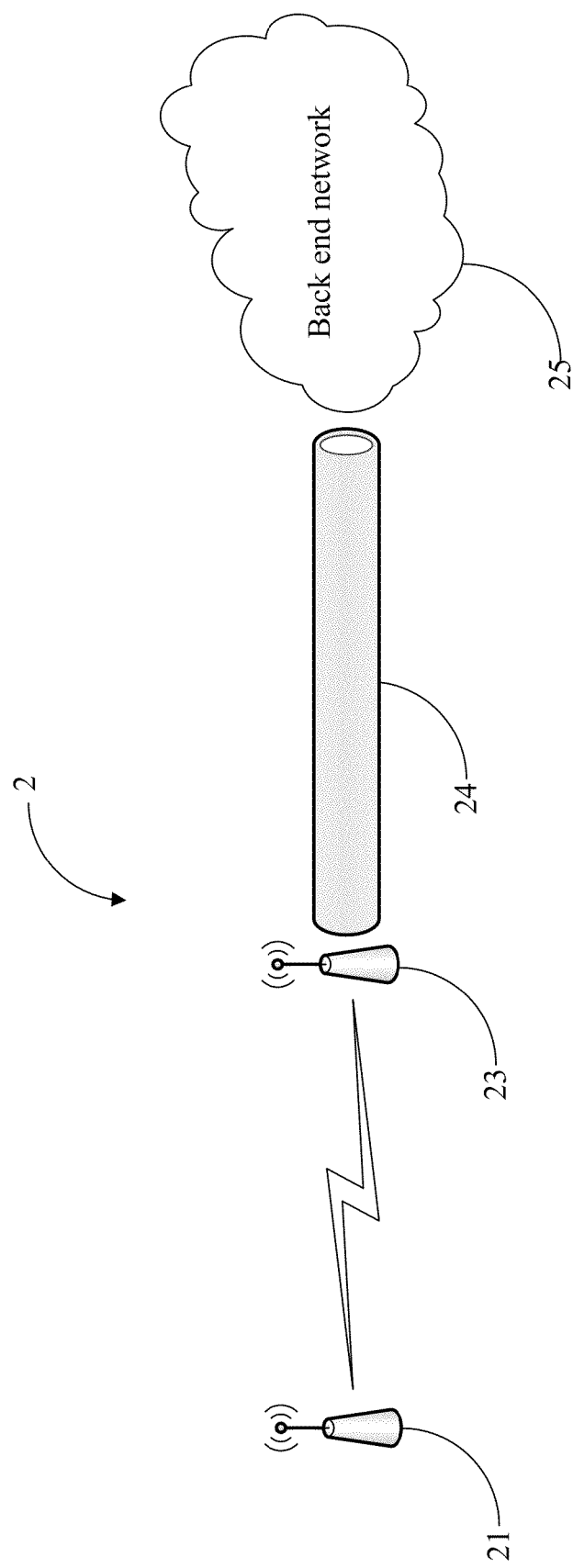
FIG. 2A illustrates an LTE network of a first embodiment of the present invention.
Figure 2B:
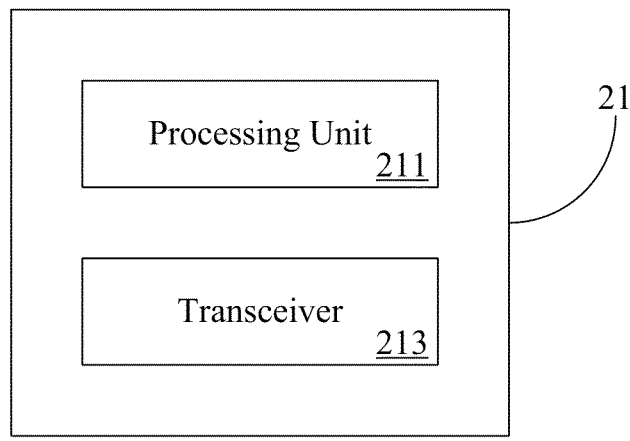
FIG. 2B illustrates a schematic view of the relay node of the first embodiment.
Figure 2C:
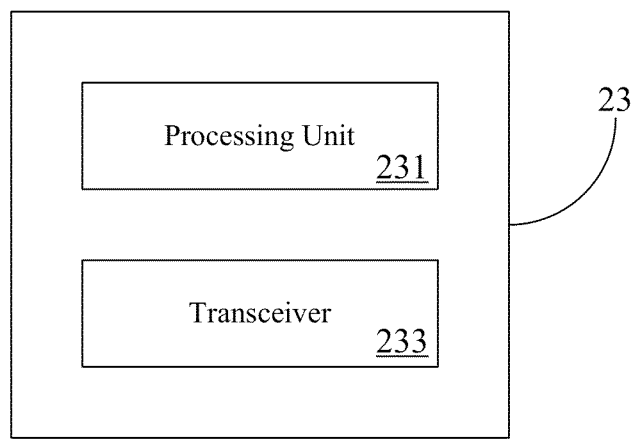
FIG. 2C illustrates a schematic view of the DeNB of the first embodiment.

Please refer to FIGS. 2A, 2B and 2C first. FIG. 2A illustrates a long-term evolution (LTE) network 2 of a first embodiment of the present invention. The LTE network 2 comprises a relay node 21, a donor evolved NodeB (DeNB) 23 and a back-end network 25. The DeNB 23 connects with the back-end network 25 via a stream control transmission protocol (SCTP) association 24. It should be noted that the back end network 25 can be composed of an evolved NodeB (eNB), a core network including mobility management entity (MME) and serving and packet data network gateway (S/P-GW), or an evolved universal terrestrial radio access network (E-UTRAN). The relay node 21 connects with the DeNB 23 wirelessly. The FIGS. 2B and 2C illustrate schematic views of the relay node 21 and the DeNB 23 of the first embodiment respectively. The relay node 21 comprises a processing unit 211 and a transceiver 213, and the DeNB 23 comprises a processing unit 231 and a transceiver 233. The interactions between the relay node 21, the DeNB 23 and the back end network 25 will be further described hereinafter.

Figure 2D:
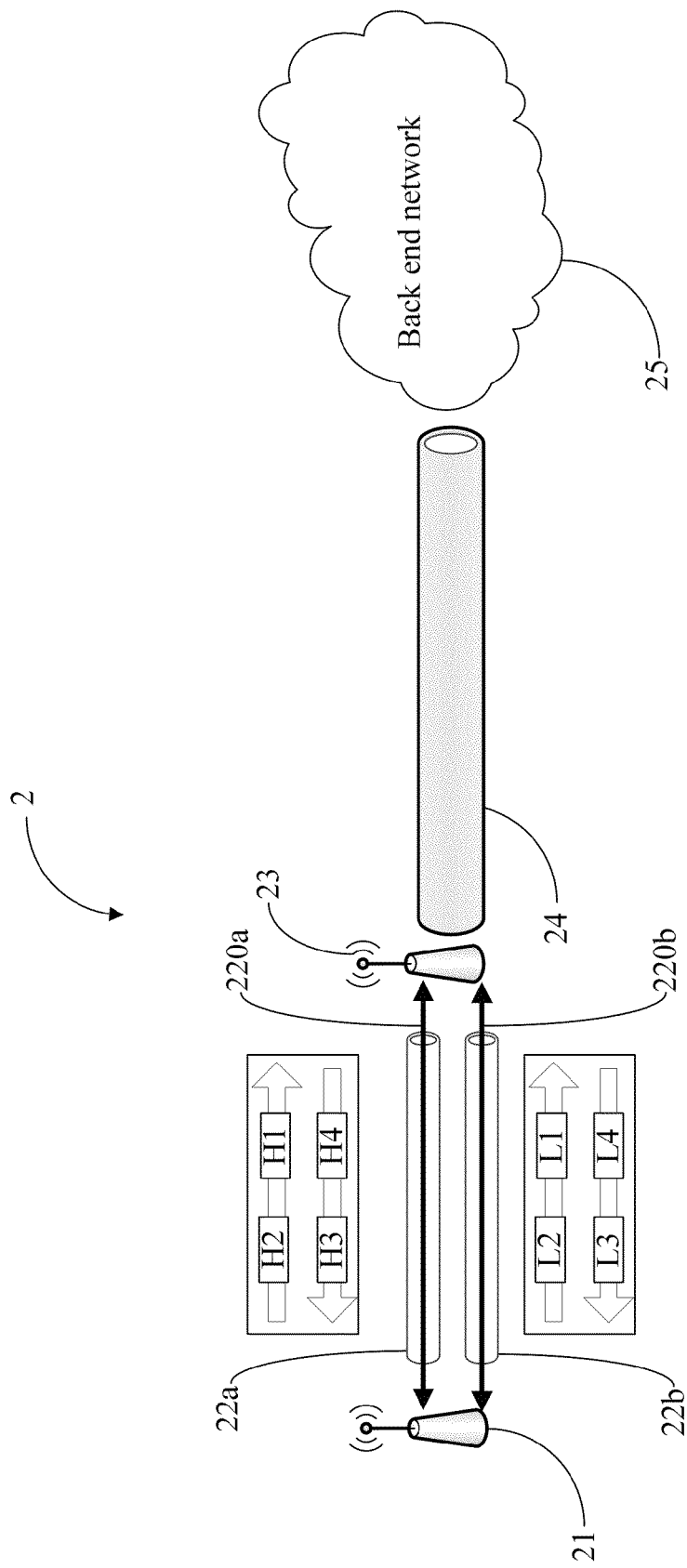
FIG. 2D illustrates the signaling message transmission in the LTE network of the first embodiment.

Please refer to FIG. 2D. FIG. 2D illustrates how the signaling messages are transmitted in the LTE network 2 of the first embodiment. First, the processing unit 211 of the relay node 21 sets up at least two bearers with the DeNB 23 at L3 layer of LTE network model. On the other hand, in view of the DeNB 23, the processing unit 231 of the DeNB 23 sets up the at least two bearers with the relay node 21. In the first embodiment, the at least two bearers comprises a first bearer 22a which includes a stream 220a and a second bearer 22b which includes a stream 220b. However, it is for the convenience to understand the present invention easily but not to limit the number of the bearers between the relay node 21 and the DeNB 23.

After setting up the first bearer 22a and the second bearer 22b between the relay node 21 and the DeNB 23, the relay node 21 starts to transmit first uplink signaling messages H1, H2 and second uplink signaling messages L1 and L2 to the DeNB 23. Particularly, the relay node 21 can firstly filter a signaling message into the first uplink signaling messages H1 and H2 and second uplink signaling messages L1 and L2 with different priorities. The first uplink signaling messages H1 and H2 are the signaling messages with first uplink priority (e.g., higher uplink priority), and the uplink signaling messages L1 and L2 are the signaling messages with second uplink priority (e.g., lower uplink priority). It should be appreciated that the signaling message is an S1 message when the DeNB 23 connects to an MME or an S/P-GW of the back end network 25, whereas the signaling message is an X2 message when the DeNB 23 connects to an evolved NodeB, another DeNB or another relay node of the back end network 25. The substitutions of the types of the signaling messages applying to the present invention can be easily understood by the people skilled in this field. Therefore, the following embodiments will be explained as S1 messages as examples, the substitutions of the signaling messages of X2 messages will not be further described.

Afterwards, the transceiver 213 of the relay node 21 transmits the first uplink signaling messages H1 and H2 with first uplink priority to the transceiver 233 of the DeNB 23 via the stream 220a of the first bearer 22a. In other words, the transceiver 233 of the DeNB 23 receives the first uplink signaling messages H1 and H2 with first uplink priority from the transceiver 213 of the relay node 21 via the stream 220a of the first bearer 22a. On the other hand, the transceiver 213 of the relay node 21 transmits the second uplink signaling messages L1 and L2 with second uplink priority to the transceiver 233 of the DeNB 23 via the stream 220b of the second bearer 22b. In other words, the transceiver 233 of the DeNB 23 receives the second uplink signaling messages L1 and L2 with second uplink priority from the transceiver 213 of the relay node 21 via the stream 220b of the second bearer 22b.

Then, similarly, the transceiver 233 of the DeNB 23 transmits first downlink signaling messages H3 and H4 with first downlink priority to the transceiver 213 of the relay node 21 via the stream 220a of the first bearer 22a as well. In other words, the transceiver 213 of the relay node 21 receives the first downlink signaling messages H3 and H4 with first downlink priority from the transceiver 233 of the DeNB 23 via the stream 220a of the first bearer 22a. The transceiver 233 of the DeNB 23 transmits second downlink signaling messages L3 and L4 with second downlink priority to the transceiver 213 of the relay node 21 via the stream 220b of the second bearer 22b as well. In other words, the transceiver 213 of the relay node 21 receives the second downlink signaling messages L3 and L4 with second downlink priority from the transceiver 233 of the DeNB 23 via the stream 220b of the second bearer 22b.

Accordingly, via the streams of the at least two bearers 22a and 22b set up between the relay node 21 and the DeNB 23 at L3 layer of LTE network model, the signaling messages H1-H4 and L1-L4 can be transmitted separately based on different priority (e.g, signaling messages H1-H4 with higher priority and signaling messages L1-L4 with lower priority) between the relay node 21 and the DeNB 23. Therefore, the blocking problem caused between the relay node 21 and the DeNB 23 can be avoided.

It should be noted that the above descriptions are for understanding the concept of the present invention easily, the first embodiment is not to limit the present invention to transmit signaling messages with specified priorities. Particularly, since the bearers are set up at L3 layer of LTE network model, each of the bearers can be used to transmit the signaling messages with different priorities dynamically based on the status of the network connections. In other words, the transmission paths of the signaling messages are adjustable between the bearers of the present invention. For example, if the bandwidths of the wireless network are not enough, the bearers can be adjusted and be apt to transmit the signaling messages with higher priority firstly.

Afterwards, the present invention applied in different LTE network environments will be further described in the following embodiments.

Figure 3A:
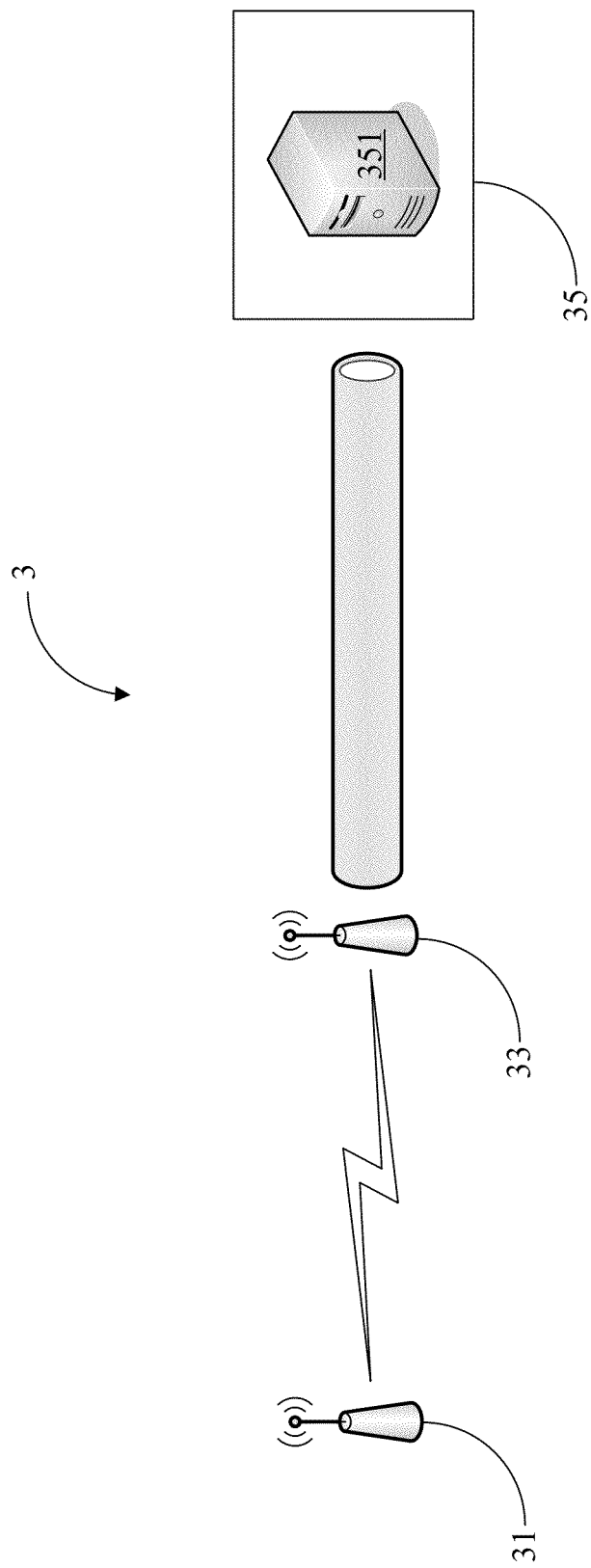
FIG. 3A illustrates an LTE network of a second embodiment of the present invention.
Figure 3B:
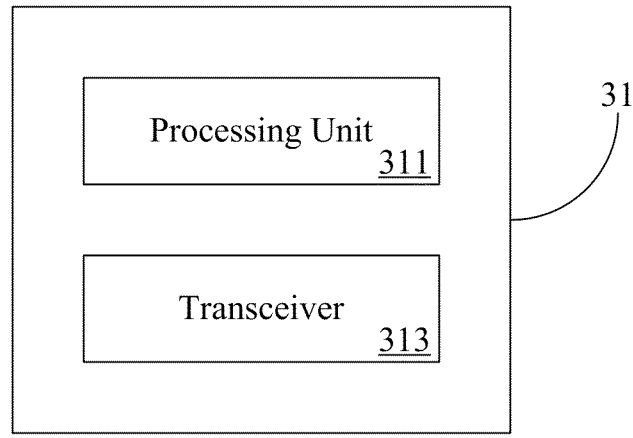
FIG. 3B illustrates a schematic view of the relay node of the second embodiment.
Figure 3C:
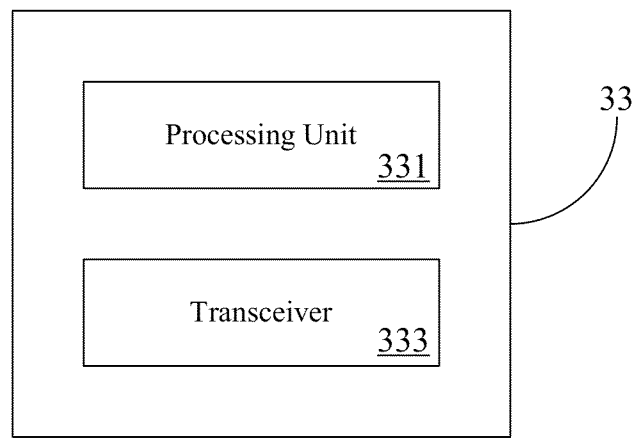
FIG. 3C illustrates a schematic view of the DeNB of the second embodiment.

Please refer to FIGS. 3A, 3B and 3C. FIG. 3A illustrates a LTE network 3 of a second embodiment of the present invention. Similarly, the LTE network 3 comprises a relay node 31, a DeNB 33 and a core network 35 which includes a mobility management entity (MME) 351. The relay node 31 connects with the DeNB 33 wirelessly, and a backhaul link is between the DeNB 33 and the MME 351 of the core network 35. The FIGS. 3B and 3C illustrate schematic views of the relay node 31 and the DeNB 33 of the second embodiment respectively. The relay node 31 comprises a processing unit 311 and a transceiver 313, and the DeNB 33 comprises a processing unit 331 and a transceiver 333.

Figure 3D:
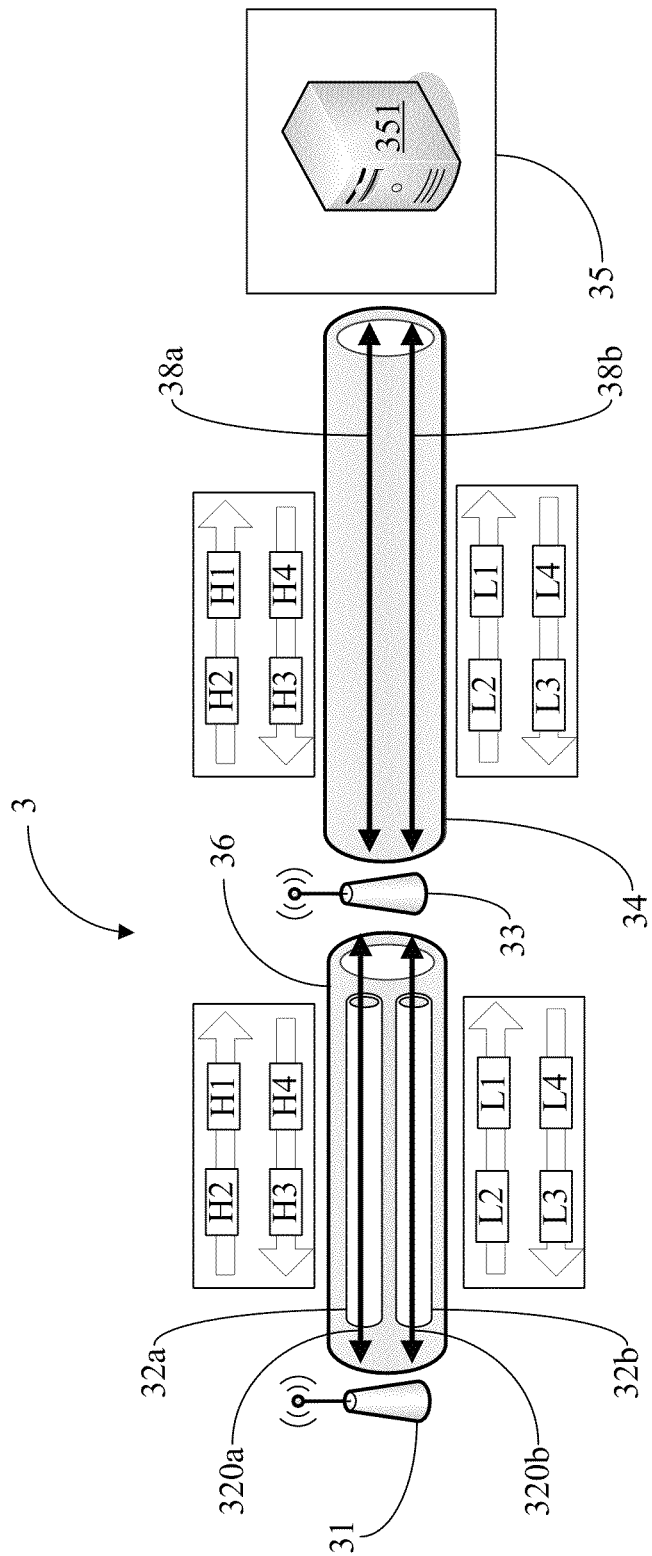
FIG. 3D illustrates the signaling message transmission in the LTE network of the second embodiment.

Next, please refer to FIG. 3D. FIG. 3D illustrates how the signaling messages are transmitted in the LTE network 3 of the second embodiment. First, the processing unit 331 of the DeNB 33 establishes a first stream control transmission protocol (SCTP) association 34 with the MME 351 of the core network 35. Then, the processing unit 331 of the DeNB 33 sets up at least two bearers with the relay node 31. On the other hand, in view of the relay node 31, the processing unit 311 of the relay node 31 sets up the at least two bearers with the DeNB 33. In the second embodiment, the at least two bearers are a first bearer 32a which includes a stream 320a and a second bearer 32b which includes a stream 320b.

After setting up the bearers, the processing unit 311 of the relay node 31 established a second SCTP association 36 with the DeNB 33. On the other hand, in view of the DeNB 33, the processing unit 331 of the DeNB 33 establishes the second SCTP association 36 with the relay node 31. Accordingly, as shown in FIG. 3D, the second SCTP association 36 can employ the first bearer 32a and the second bearer 32b.

It should noted that, in the second embodiment, the DeNB 33 is embedded with a signaling message proxy which can re-process the control messages before sending them out; therefore, the connection between the relay node 31 and the MME 351 of the core network 35 can be separated (i.e., in the second embodiment, the connection between the relay node 31 and the MME 351 of the core network 35 are separated into the first SCTP association 34 and the second SCTP association 36). Further, the signaling message proxy embedded in the DeNB 33 can further achieve the mapping of the streams with the bearers so that the streams map to the bearers one-to-one. Moreover, the DeNB 33 is further embedded with an S/P-GW which can configure same internet protocol (IP) address and port number of the second SCTP association 36 for the bearers 32a and 32b and can filter a stream identifier of the SCTP association 36 for mapping the streams 38a and 38b to corresponding bearers 32a and 32b so that the bearers 32a and 32b can correctly transmit messages within the second SCTP association 36 accordingly.

Similarly, after setting up the first bearer 32a and the second bearer 32b between the relay node 31 and the DeNB 33 in the second SCTP association 36, the relay node 31 starts to transmit first uplink signaling messages H1, H2 and second uplink signaling messages L1, L2 to the DeNB 33. Particularly, the relay node 31 can firstly filter signaling messages into the first uplink signaling messages H1, H2 and second uplink signaling messages L1 and L2 as well. The first uplink signaling messages H1 and H2 are the signaling messages with first uplink priority (e.g., higher priority), and the second uplink signaling messages L1 and L2 are the signaling messages with second uplink priority (e.g., lower priority).

Afterwards, the transceiver 313 of the relay node 31 transmits the first uplink signaling messages H1 and H2 with first uplink priority to the transceiver 333 of the DeNB 33 via the stream 320a of the first bearer 32a. In other words, the transceiver 333 of the DeNB 33 receives the first uplink signaling messages H1 and H2 with first uplink priority from the transceiver 313 of the relay node 31 via the stream 320a of the first bearer 32a. On the other hand, the transceiver 313 of the relay node 31 transmits the second uplink signaling messages L1 and L2 with second uplink priority to the transceiver 333 of the DeNB 33 via the stream 320b of the second bearer 32b. In other words, the transceiver 333 of the DeNB 33 receives the second uplink signaling messages L1 and L2 with second uplink priority from the transceiver 313 of the relay node 31 via the stream 320b of the second bearer 32b.

Then, after the DeNB 33 receives the signaling messages H1, H2, L1 and L2 separately via the streams 320a and 320b of the bearer 32a and 32b, the DeNB 33 transmits first uplink signaling message H1 and H2 to the MME 351 of the core network 35 via a stream 38a within the first SCTP association 34, and transmits the second uplink signaling messages L1 and L2 to the MME 351 of the core network 35 via a stream 38b within the first SCTP association 34. It should noted that, in the second embodiment, the S/P-GW embedded in the DeNB 33 can further map the streams 38a and 38b within the SCTP association 34 to the streams 320a and 320b within the bearer 32a and 32b respectively so that the messages between the relay node 31 and the MME 351 of the core network 35 can be transmitted correspondingly.

Afterwards, after the MME 351 of the core network 35 receives the signaling messages H1, H2, L1 and L2, the MME 351 of the core network 35 transmits first downlink signaling messages H3 and H4 with first downlink priority to the DeNB 33 via the stream 38a within the first SCTP association 34, and transmits second downlink signaling message L3 and L4 with second downlink priority to the DeNB 33 via the stream 38b within the first SCTP association 34. Accordingly, the transceiver 333 of the DeNB 33 transmits the first downlink signaling messages H3 and H4 with first downlink priority to the transceiver 313 of the relay node 31 via the stream 320a of the first bearer 32a as well. In other words, the transceiver 313 of the relay node 31 receives the first downlink signaling messages H3 and H4 with first downlink priority from the transceiver 333 of the DeNB 33 via the stream 320a of the first bearer 32a. The transceiver 333 of the DeNB 33 transmits the second downlink signaling messages L3 and L4 with second downlink priority to the transceiver 313 of the relay node 31 via the stream 320b of the second bearer 32b as well. In other words, the transceiver 313 of the relay node 31 receives the second downlink signaling messages L3 and L4 with second downlink priority from the transceiver 333 of the DeNB 33 via the stream 320b of the second bearer 32b.

Accordingly, via the streams of the at least two bearers 32a and 32b set up between the relay node 31 and the DeNB 33 in the second SCTP association 36, the signaling messages H1-H4 and L1-L4 can be transmitted separately based on different priority (e.g, signaling messages H1-H4 with higher priority and signaling messages L1-L4 with lower priority) between the relay node 31 and the DeNB 33. Therefore, the blocking problem caused between the relay node 31 and the DeNB 33 can be avoided.

Accordingly, based on the present invention, since the blocking problem between the relay node 31 and the DeNB 33 is solved, the signaling messages transmitted between the DeNB 33 and the MME 351 of the core network 35 can be transmitted separately as well. Therefore, the signaling message transmissions between the DeNB 33 and the MME 351 of the core network 35 will not be influenced by the HOL problem as well.

It should be noted that, in the second embodiment, some new Quality of Service class identifier (QCI) can be introduced based on the requirements of the signaling messages. Specifically, according to the conventional QCI, there are no classifications for the requirements of the signaling message. Therefore, in the present invention, if the signaling messages need to be transmitted based on the quality of service, new QCI can be introduced for the bearers accordingly. For example, a new QCI for transmitting some signaling messages with higher priorities could be limited as smaller packet error lose rate, e.g., the QCI defines the packet error lose rate of the signaling messages must less than 0.000001. Therefore, new QCI for maintaining the quality of service can be applied in the present invention.

Next, a third embodiment of the present invention will be described. It should be noted that the hardware modules used in the third embodiment are the same as the hardware modules used in the second embodiment. Hence, the details of the hardware modules will not be further described again. The difference between the second embodiment and the third embodiment is the connection between the relay node 31 and the DeNB 33.

Figure 4:
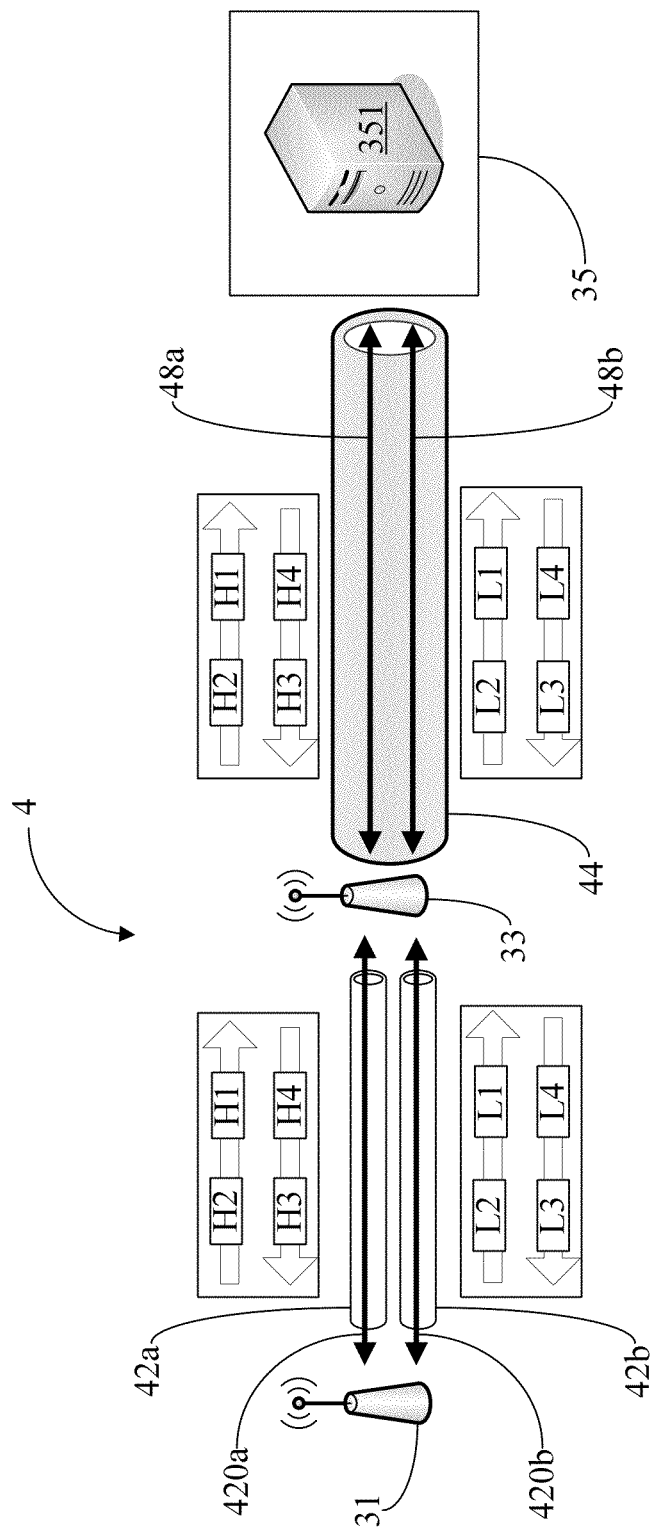
FIG. 4 illustrates the signaling message transmission in the LTE network of the third embodiment.

Particularly, please refer to FIG. 4, it illustrates how the signaling messages are transmitted in a LTE network 4 of the third embodiment. First, the processing unit 331 of the DeNB 33 establishes a first SCTP association 44 with the MME 351 of the core network 35. Then, the processing unit 331 of the DeNB 33 sets up at least two bearers with the relay node 31. On the other hand, in the view of the relay node 31, the processing unit 311 of the relay node 31 sets up the at least two bearers with the DeNB 33. In the third embodiment, the at least two bearers are a first bearer 42a which includes a stream 420a and a second bearer 42b which includes a stream 420b, and the bearers 42a and 42b are established as radio resource control (RRC) connections with the DeNB 33.

Similarly, in the third embodiment, the DeNB 33 is embedded with a signaling message proxy which can re-process the control messages before sending them out; therefore, the connection between the relay node 31 and the MME 351 of the core network 35 can be separated (i.e., in the third embodiment, the connection between the relay node 31 and the MME 351 of the core network 35 are separated into the first SCTP association 44 and the bearers 42a and 42b). Further, in the third embodiment, the signaling message proxy embedded in the DeNB 33 can further achieve the mapping of the streams with the bearers so that the streams map to the bearers one-to-one.

Similarly, after setting up the first bearer 42a and the second bearer 42b between the relay node 31 and the DeNB 33, the relay node 31 starts to transmit first uplink signaling messages H1, H2 and second uplink signaling messages L1 and L2 to the DeNB 33. Particularly, the relay node 31 can firstly filter signaling messages into the first uplink signaling messages H1, H2 and second uplink signaling messages L1 and L2. The first uplink signaling messages H1 and H2 are the signaling messages with first uplink priority (e.g., higher priority), and the second uplink signaling messages L1 and L2 are the signaling messages with second uplink priority (e.g., lower priority).

Afterwards, the transceiver 313 of the relay node 31 transmits the first uplink signaling messages H1 and H2 with first uplink priority to the transceiver 333 of the DeNB 33 via the stream 420a of the first bearer 42a. In other words, the transceiver 333 of the DeNB 33 receives the signaling messages H1 and H2 with first uplink priority from the transceiver 313 of the relay node 31 via the stream 420a of the first bearer 42a. On the other hand, the transceiver 313 of the relay node 31 transmits the second uplink signaling messages L1 and L2 with second uplink priority to the transceiver 333 of the DeNB 33 via the stream 420b of the second bearer 42b. In other words, the transceiver 333 of the DeNB 33 receives the second uplink signaling messages L1 and L2 with second uplink priority from the transceiver 313 of the relay node 31 via the stream 420b of the second bearer 42b.

Then, after the DeNB 33 receives the signaling messages H1, H2, L1 and L2 separately via the streams 420a and 420b of the bearer 42a and 42b, the DeNB 33 transmits first uplink signaling message H1 and H2 to the MME 351 of the core network 35 via a stream 48a within the first SCTP association 44, and transmits the second uplink signaling messages L1 and L2 to the MME 351 of the core network 35 via a stream 48b within the first SCTP association 44. It should noted that, in the second embodiment, the DeNB 33 can further map the streams 48a and 48b within the SCTP association 44 to the streams 420a and 420b within the bearer 42a and 42b respectively so that the messages between the relay node 31 and the MME 351 of the core network 35 can be transmitted correspondingly.

Afterwards, after the MME 351 of the core network 35 receives the signaling messages H1, H2, L1 and L2, the MME 351 of the core network 35 transmits first downlink signaling messages H3 and H4 with first downlink priority to the DeNB 33 via the stream 48a within the first SCTP association 44, and transmits second downlink signaling message L3 and L4 with second downlink priority to the DeNB 33 via the stream 48b within the first SCTP association 44. Accordingly, the transceiver 333 of the DeNB 33 transmits the first downlink signaling messages H3 and H4 with first downlink priority to the transceiver 313 of the relay node 31 via the stream 420a of the first bearer 42a as well. In other words, the transceiver 313 of the relay node 31 receives the first downlink signaling messages H3 and H4 with first downlink priority from the transceiver 333 of the DeNB 33 via the stream 420a of the first bearer 42a. The transceiver 333 of the DeNB 33 transmits the second downlink signaling messages L3 and L4 with second downlink priority to the transceiver 313 of the relay node 31 via the stream 420b of the second bearer 42b as well. In other words, the transceiver 313 of the relay node 31 receives the second downlink signaling messages L3 and L4 with second downlink priority from the transceiver 333 of the DeNB 33 via the stream 420b of the second bearer 42b.

Accordingly, as the same result in second embodiment, via the streams of the at least two bearers 42a and 42b set up between the relay node 31 and the DeNB 33, the signaling messages H1-H4 and L1-L4 can be transmitted separately based on different priority (e.g, signaling messages H1-H4 with higher priority and signaling messages L1-L4 with lower priority). Therefore, the blocking problem caused between the relay node 31 and the DeNB 33 can be avoided in the network environment of the third embodiment.

Similarly, the signaling message transmissions between the DeNB 33 and the MME 351 of the core network 35 will not be influenced by the HOL problem since the DeNB 33 can receives the signaling messages H1-H4 and L1-L4 separately based on different priorities, and then transmits the signaling messages H1-H4 and L1-L4 separately based on different priorities as well via different streams (such as streams 48a and 48b). It should noted that, in the third embodiment, the DeNB 33 can also map the streams 48a and 48b within the SCTP association 44 to the streams 420a and 420b within the bearer 42a and 42b respectively so that the messages between the relay node 31 and the MME 351 of the core network 35 can be transmitted correspondingly. Therefore, the signaling message transmissions between the DeNB 33 and the MME 351 of the core network 35 will not be influenced by the HOL problem as well.

It should be noted that, in the third embodiment, extra bearers can be established if some QoSs need to be achieved. Specifically, if there are some signaling messages with different priority need to be transmitted on time, a new bearer as an RRC connection can be established for transmitting the signaling messages with different priority. Therefore, the required QoS can be achieved.

Next, a fourth embodiment of the present invention will be described. It should be noted that the hardware modules used in the fourth embodiment are the same as the hardware modules used in the second embodiment. Hence, the details of the hardware modules will not be further described again. The difference between the second embodiment and the fourth embodiment is the connection between the relay node 31, the DeNB 33 and the MME 351 of the core network 35.

Figure 5:
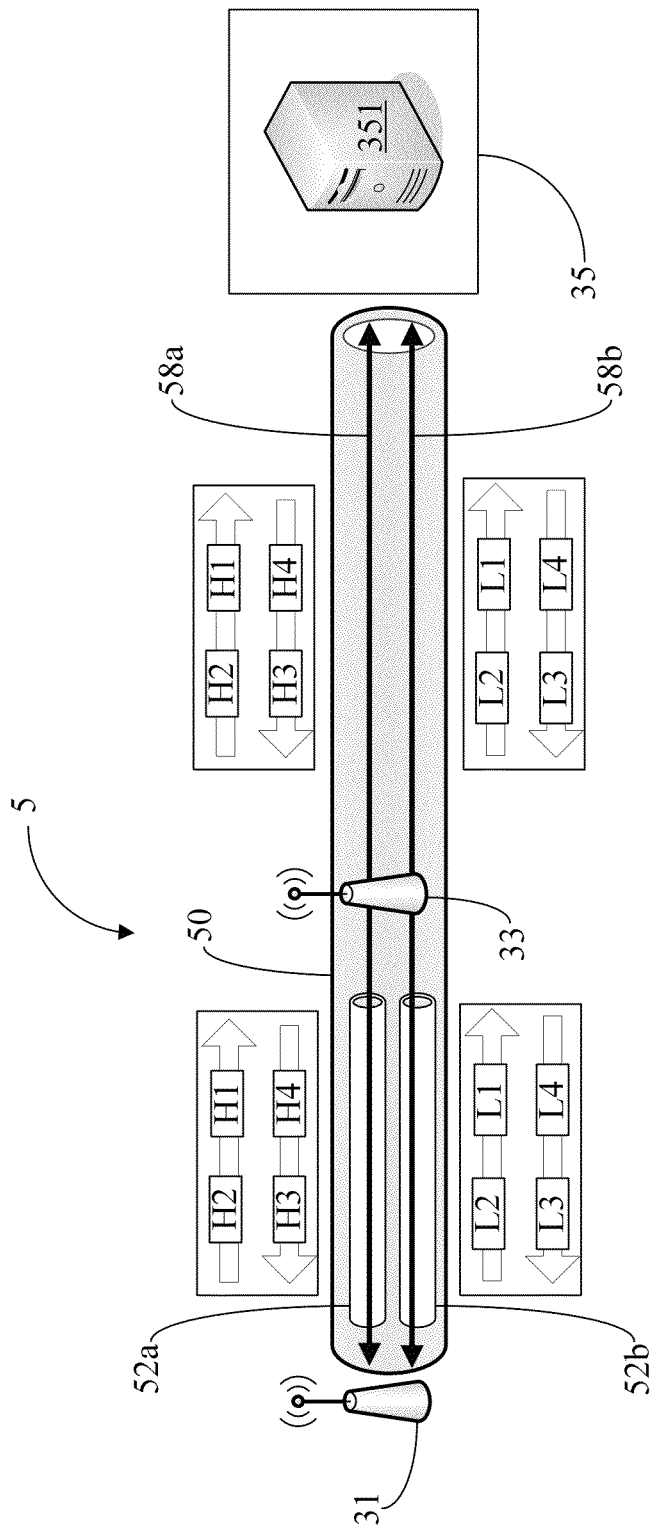
FIG. 5 illustrates the signaling message transmission in the LTE network of the fourth embodiment.

Particularly, please refer to FIG. 5, it illustrates how the signaling messages are transmitted in a LTE network 5 of the fourth embodiment. First, the processing unit 311 of the relay node 31 established a SCTP association 50 with the MME 351 of the core network 35 via the DeNB 33. On the other hand, in view of the DeNB 33, the processing unit 331 of the DeNB 33 helps establish the SCTP association 50 between the relay node 31 and the MME 351 of the core network 35. Then, the processing unit 331 of the DeNB 33 sets up at least two bearers with the relay node 31. On the other hand, in view of the relay node 31, the processing unit 311 of the relay node 31 sets up the at least two bearers with the DeNB 33. In the fourth embodiment, the at least two bearers are a first bearer 52a and a second bearer 52b. Accordingly, as shown in FIG. 5, the SCTP association 50 can employ the first bearer 52a and the second bearer 52b.

It should be noted that, in the fourth embodiment, the DeNB 33 is not embedded with a signaling message proxy. Therefore, the DeNB 33 directly forwards the network messages from the relay node 31 to the MME 351 of the core network 35 via the SCTP association 50. Whereas, in the fourth embodiment, the DeNB 33 is also embedded with an S/P-GW which can configure same IP address and port number of the SCTP association 50 for the bearers 52a and 52b and can filter a stream identifier of the SCTP association 50 for mapping the streams 58a and 58b to corresponding bearers 52a and 52b so that the bearers 52a and 52b can correctly transmit messages within the SCTP association 50 accordingly. The S/P-GW embedded in the DeNB 33 can further achieve service data flow (SDF) detection for supporting the mappings between the streams 58a and 58b in the backhaul link and the bearers 52a and 52b respectively. Moreover, the relay node 31, the DeNB 33 and the MME 351 of the core network 35 share the same SCTP association 50 since stream 58a and 58b can be also used within the bearers 52a and 52b in the SCTP association 50, which is described in FIG. 5.

Similarly, after setting up the first bearer 52a and the second bearer 52b between the relay node 31 and the DeNB 33 in the SCTP association 50, the relay node 31 starts to transmit first uplink signaling messages H1, H2 and second uplink signaling messages L1 and L2 to the DeNB 33. Particularly, the relay node 31 can firstly filter signaling messages into the first uplink signaling messages H1, H2 and second uplink signaling messages L1 and L2. The first uplink signaling messages H1 and H2 are the signaling messages with first uplink priority (e.g., higher priority), and the second uplink signaling messages L1 and L2 are the signaling messages with second uplink priority (e.g., lower priority).

Afterwards, the transceiver 313 of the relay node 31 transmits the first uplink signaling messages H1 and H2 with the first uplink priority to the transceiver 333 of the DeNB 33 via the stream 58a within the first bearer 52a. In other words, the transceiver 333 of the DeNB 33 receives the first uplink signaling messages H1 and H2 with first uplink priority from the transceiver 313 of the relay node 31 via the stream 58a within the first bearer 52a. On the other hand, the transceiver 313 of the relay node 31 transmits the second uplink signaling messages L1 and L2 with second uplink priority to the transceiver 333 of the DeNB 33 via the stream 58b within the second bearer 52b. In other words, the transceiver 333 of the DeNB 33 receives the second uplink signaling messages L1 and L2 with second uplink priority from the transceiver 313 of the relay node 31 via the stream 58b of the second bearer 52b.

Then, similarly, after the DeNB 33 receives the signaling messages H1, H2, L1 and L2 separately via the streams 58a and 58b of the bearer 52a and 52b, the DeNB 33 transmits first uplink signaling message H1 and H2 to the MME 351 of the core network 35 via the stream 58a within the SCTP association 50, and transmits the second uplink signaling messages L1 and L2 to the MME 351 of the core network 35 via the stream 58b within the first SCTP association 50.

Afterwards, after the MME 351 of the core network 35 receives the signaling messages H1, H2, L1 and L2, the MME 351 of the core network 35 transmits first downlink signaling messages H3 and H4 with first downlink priority to the DeNB 33 via the stream 58a within the SCTP association 50, and transmits second downlink signaling message L3 and L4 with second downlink priority to the DeNB 33 via the stream 58b within the SCTP association 50. Accordingly, the transceiver 333 of the DeNB 33 transmits the first downlink signaling messages H3 and H4 with first downlink priority to the transceiver 313 of the relay node 31 via the stream 58a within the first bearer 52a. In other words, the transceiver 313 of the relay node 31 receives the first downlink signaling messages H3 and H4 with first downlink priority from the transceiver 333 of the DeNB 33 via the stream 58a within the first bearer 52a. The transceiver 333 of the DeNB 33 transmits the second downlink signaling messages L3 and L4 with second downlink priority to the transceiver 313 of the relay node 31 via the stream 58b within the second bearer 52b. In other words, the transceiver 313 of the relay node 31 receives the second downlink signaling messages L3 and L4 with second downlink priority from the transceiver 333 of the DeNB 33 via the stream 58b of the second bearer 52b.

Accordingly, as the same result in second embodiment, via the at least two bearers 52a and 52b set up between the relay node 31 and the DeNB 33 in the SCTP association 50, the signaling messages H1-H4 and L1-L4 can be transmitted separately based on different priority (e.g, signaling messages H1-H4 with higher priority and signaling messages L1-L4 with lower priority). Therefore, the blocking problem caused between the relay node 31 and the DeNB 33 can be avoided in the network environment of the fourth embodiment.

Similarly, the signaling message transmissions between the DeNB 33 and the MME 351 of the core network 35 will not be influenced by the HOL problem since the DeNB 33 can receives the signaling messages H1-H4 and L1-L4 separately based on different priorities, and then transmits the signaling messages H1-H4 and L1-L4 separately based on different priorities as well via the streams 58a and 58b.

It should be noted that, similar as the second embodiment, some new QCI can be introduced based on the requirements of the signaling messages in the fourth embodiment. Similarly, according to the conventional QCI, there are no classifications for the requirements of the signaling message. Therefore, in the fourth embodiment, if the signaling messages need to be transmitted based on the quality of service, new QCI can be introduced for the bearers accordingly. For example, a new QCI for transmitting some signaling messages with higher priorities could be limited as smaller packet error lose rate, e.g., the QCI defines the packet error lose rate of the signaling messages must less than 0.000001. Therefore, new QCI for maintaining the quality of service can be applied in the fourth embodiment.

Next, the details of a fifth embodiment of the present invention will be described. It should be noted that the hardware modules of the fifth embodiment are the same as the hardware modules of the fourth embodiment. Hence, the details will not be further described again. The difference between the fourth embodiment and the fifth embodiment is that the core network 35 of the fifth embodiment further comprises an S/P-GW 353.

Figure 6A:
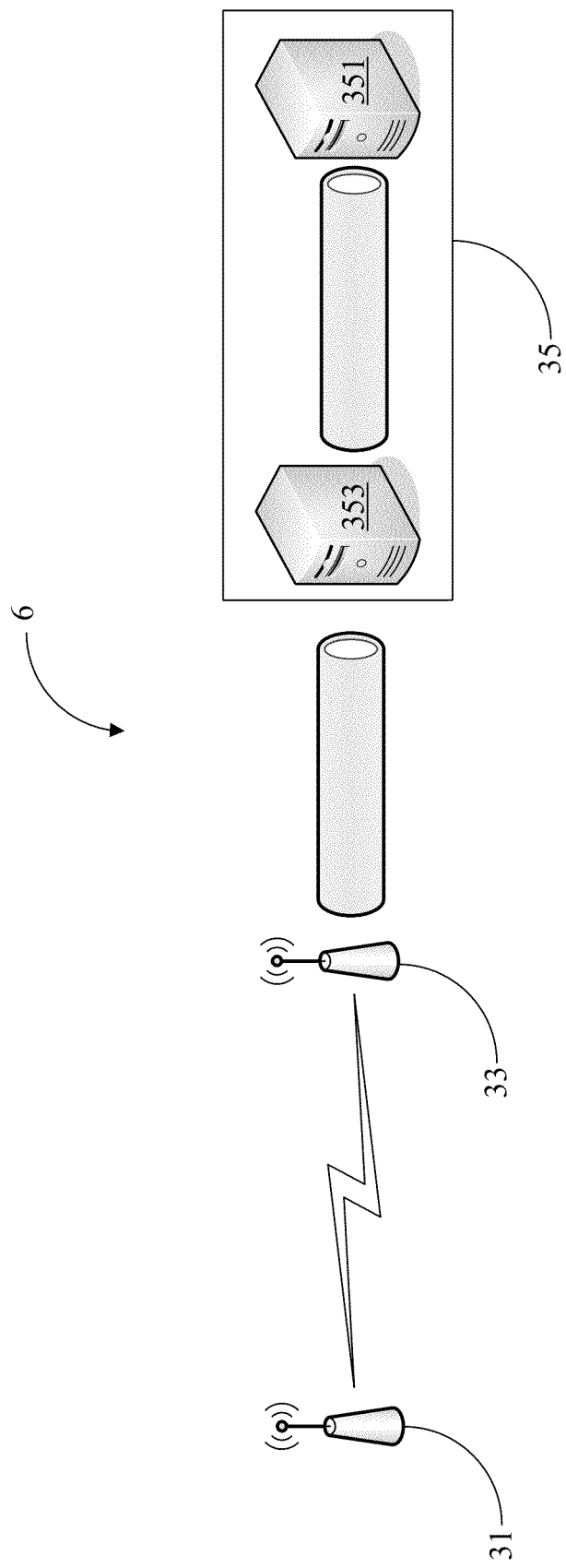
FIG. 6A illustrates an LTE network of a fifth embodiment of the present invention.
Figure 6B:
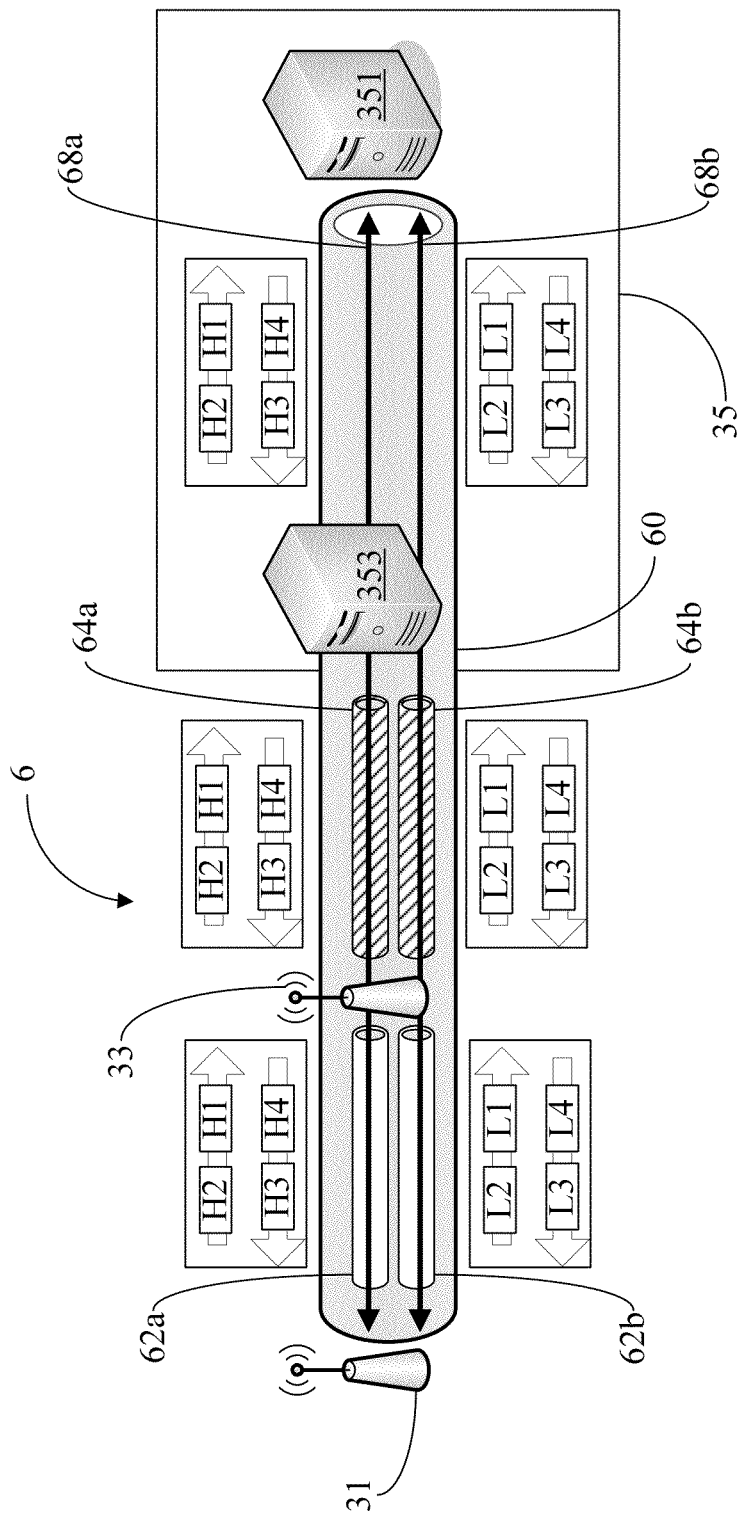
FIG. 6B illustrates the signaling message transmission in the LTE network of the fifth embodiment.

Particularly, please refer to FIGS. 6A and 6B. FIG. 6A illustrates a schematic view of a LTE network 6 of the fifth embodiment, and FIG. 6B illustrates how the signaling messages are transmitted in the LTE network 6 of the fifth embodiment. First, the processing unit 311 of the relay node 31 established an SCTP association 60 with the S/P-GW 353 and the MME 351 of the core network 35 via the DeNB 33. On the other hand, in view of the DeNB 33, the processing unit 331 of the DeNB 33 helps establish the SCTP association 60 between the relay node 31, the S/P-GW 353 and the MME 351 of the core network 35.

Then, the processing unit 331 of the DeNB 33 sets up at least two bearers with the relay node 31. On the other hand, in view of the relay node 31, the processing unit 311 of the relay node 31 sets up the at least two bearers with the DeNB 33. And then, the processing unit 331 of the DeNB 33 establishes at least two GPRS tunneling protocol for user plane (GTP-U) connections with the S/P-GW 353 of the core network 35.

It should be appreciated that, in the fifth embodiment, the at least two GTP-U connections comprises a first GTP-U connection 64a and a second GTP-U connection 64b, and the at least two bearers are a first bearer 62a and a second bearer 62b. The first GTP-U connection 64a and the second GTP-U connection 64b correspond to the first bearer 62a and the second bearer 62b respectively. Therefore, the processing unit 331 of the DeNB 33 maps the first bearer 62a to the first GTP-U connection 64a, and maps the second bearer 62b to the second GTP-U connection 64b so that the signaling messages between the relay node 31, the DeNB 33 and the S/P-GW 353 can be transmitted correctly. Accordingly, as shown in FIG. 6B, the SCTP association 60 can employ the first bearer 62a, the second bearer 62b, the first GTP-U connection 64a and the second GTP-U connection 64b.

Furthermore, in the previous embodiments, S/P-GWs are embedded with the DeNBs. However, in the fifth embodiment, the S/P-GW 353 is isolated from the DeNB 31, and is included in the core network 35. Therefore, some connections (such as the GTP-U connections 64a and 64b) need to be set up between the DeNB 33 and the S/P-GW 353 of the core network 35. Similarly, the S/P-GW 353 can configure same IP address and port number of the SCTP association 60 for the bearers 64a and 64b and can filter a stream identifier of the SCTP association 60 for mapping the streams 68a and 68b to corresponding bearers 64a and 64b so that the bearers 64a and 64b can correctly transmit messages within the SCTP association 60 accordingly. The S/P-GW 353 can further achieve SDF detection for supporting the mappings between the streams 68a and 68b in the backhaul link and the bearers 64a and 64b respectively. Moreover, since the relay node 31, the DeNB 33 and the MME 351 of the core network 35 share the same SCTP association 60, stream 68a and 68b can be used within the bearers 62a and 62b in the SCTP association 60, which is described in FIG. 6B. Moreover, since the relay node 31, the DeNB 33, the S/P-GW 353 and the MME 351 of the core network 35 share the same SCTP association 60, stream 68a and 68b can be used within the bearers 62a, 62b and the GTP-U connections 64a, 64b in the SCTP association 60, which is described in FIG. 6B.

Afterwards, after setting up the first bearer 62a and the second bearer 62b between the relay node 31 and the DeNB 33 in the SCTP association 60, the relay node 31 starts to transmit first uplink signaling messages H1, H2 and second uplink signaling messages L1 and L2 to the DeNB 33. Particularly, the relay node 31 can firstly filter signaling messages into the first uplink signaling messages H1, H2 and the second uplink signaling messages L1 and L2. The first uplink signaling messages H1 and H2 are the signaling messages with first uplink priority (e.g., higher priority), and the signaling messages L1 and L2 are the signaling messages with second uplink priority (e.g., lower priority).

Afterwards, the transceiver 313 of the relay node 31 transmits the first uplink signaling messages H1 and H2 with first uplink priority to the transceiver 333 of the DeNB 33 via the stream 68a within the first bearer 62a. In other words, the transceiver 333 of the DeNB 33 receives the first uplink signaling messages H1 and H2 with first uplink priority from the transceiver 313 of the relay node 31 via the stream 68a within the first bearer 62a. On the other hand, the transceiver 313 of the relay node 31 transmits the second uplink signaling messages L1 and L2 with second uplink priority to the transceiver 333 of the DeNB 33 via the stream 68b within the second bearer 62b. In other words, the transceiver 333 of the DeNB 33 receives the second uplink signaling messages L1 and L2 with second uplink priority from the transceiver 313 of the relay node 31 via the stream 68b within the second bearer 62b.

Then, similarly, after the DeNB 33 receives the signaling messages H1, H2, L1 and L2 separately via the streams 68a and 68b of the bearer 62a and 62b, the DeNB 33 transmits the first uplink signaling message H1 and H2 to the S/P-GW 353 of the core network 35 via the stream 68a of the GTP-U connection 64a, and transmits the second uplink signaling messages L1 and L2 to the S/P-GW 353 of the core network 35 via the stream 68b of the GTP-U connection 64b.

Next, after receiving the signaling messages H1, H2, L1 and L2, the S/P-GW 353 transmits the signaling messages H1, H2, L1 and L2 to the MME 351 via the streams 68a and 68b within the SCTP association 60 directly. Afterwards, after the MME 351 of the core network 35 receives the signaling messages H1, H2, L1 and L2, the MME 351 transmits first downlink signaling messages H3 and H4 with first downlink priority to the S/P-GW 353 via the stream 68a within the SCTP association 60, and transmits second downlink signaling message L3 and L4 with second downlink priority to the S/P-GW 353 via the stream 68b within the SCTP association 60. Accordingly, after receiving the signaling messages H3, H4, L3 and L4, the S/P-GW 353 transmits the signaling messages H3, H4, L3 and L4 to the DeNB 33 via the streams 68a and 68b within the GTP-U connections 64a and 64b respectively.

Accordingly, the transceiver 333 of the DeNB 33 transmits the first downlink signaling messages H3 and H4 with first downlink priority to the transceiver 313 of the relay node 31 via the stream 68a within the first bearer 62a. In other words, the transceiver 313 of the relay node 31 receives the first downlink signaling messages H3 and H4 with first downlink priority from the transceiver 333 of the DeNB 33 via the stream 68a within the first bearer 62a. The transceiver 333 of the DeNB 33 transmits the second downlink signaling messages L3 and L4 with second downlink priority to the transceiver 313 of the relay node 31 via the stream 68b within the second bearer 62b. In other words, the transceiver 313 of the relay node 31 receives the second downlink signaling messages L3 and L4 with second downlink priority from the transceiver 333 of the DeNB 33 via the stream 68b of the second bearer 62b.

Similarly, as the same result in fourth embodiment, via the at least two bearers 62a and 62b set up between the relay node 31 and the DeNB 33 based on the SCTP association 60, the signaling messages H1-H4 and L1-L4 can be transmitted separately based on different priority (e.g, signaling messages H1-H4 with higher priority and signaling messages L1-L4 with lower priority). Therefore, the blocking problem caused between the relay node 31 and the DeNB 33 can be avoided in the network environment of the fifth embodiment.

Furthermore, since the blocking problem between the relay node 31 and the DeNB 33 is solved, the signaling messages transmitted between the DeNB 33 and the MME 351 of the core network 35 can be separated accordingly. Therefore, the signaling message transmissions between the DeNB 33 and the MME 351 of the core network 35 will not be influenced by the HOL problem as well.

It should be noted that, similar as the second embodiment, some new QCI can be introduced based on the requirements of the signaling messages in the fifth embodiment. Similarly, according to the conventional QCI, there are no classifications for the requirements of the signaling message. Therefore, in the fifth embodiment, if the signaling messages need to be transmitted based on the quality of service, new QCI can be introduced for the bearers accordingly. For example, a new QCI for transmitting some signaling messages with higher priorities could be limited as smaller packet error lose rate, e.g., the QCI defines the packet error lose rate of the signaling messages must less than 0.000001. Therefore, new QCI for maintaining the quality of service can be applied in the fifth embodiment.

Next, the details of a sixth embodiment of the present invention will be described. It should be noted that the hardware modules of the sixth embodiment are the same as the hardware modules of the first embodiment. Hence, the details will not be further described again. The different between the first embodiment and the sixth embodiment are the priorities of the signaling messages.

Figure 7:
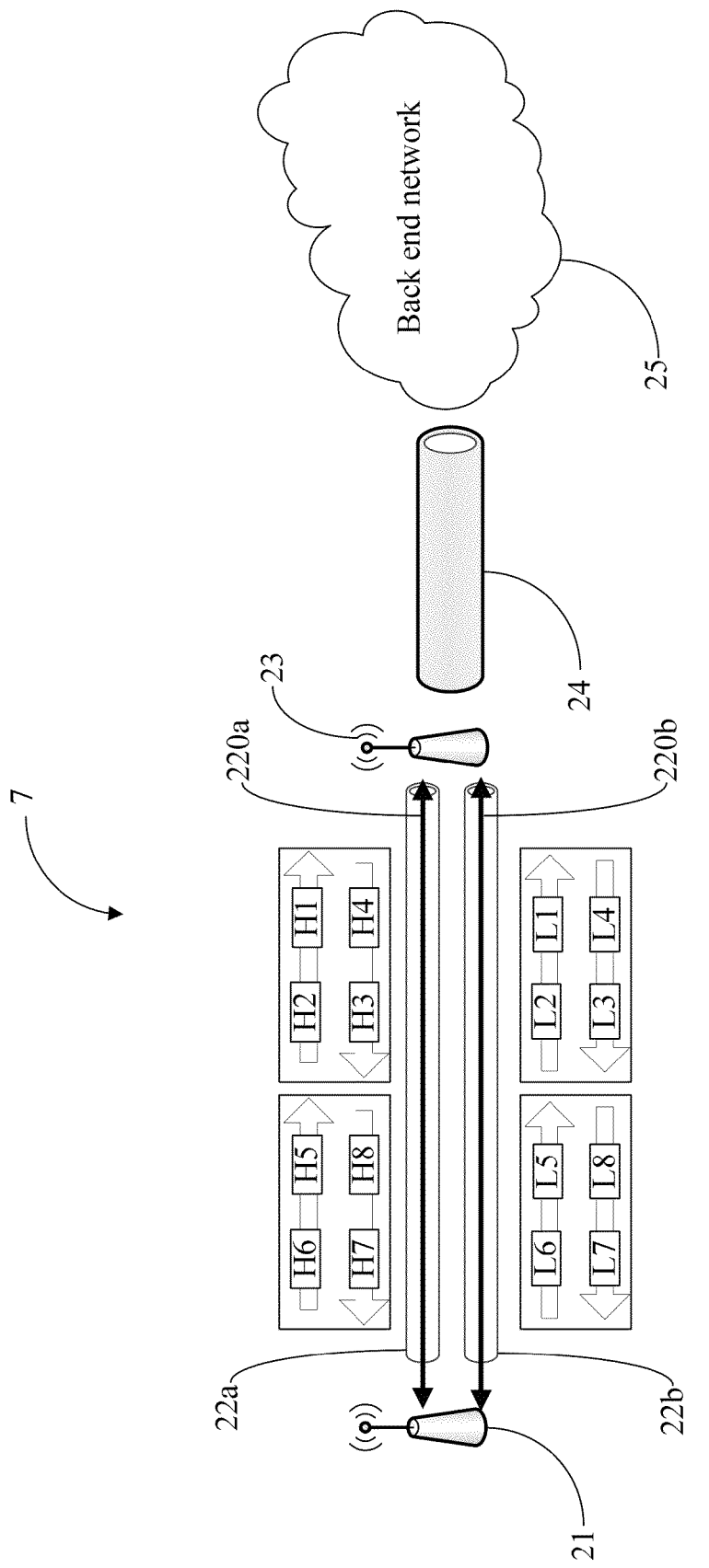
FIG. 7 illustrates the signaling message transmission in the LTE network of the sixth embodiment.

Please refer to FIG. 7, it illustrates how the signaling messages are transmitted in a LTE network 7 of the sixth embodiment. Particularly, the procedures of building the connections and the transmission of the signaling messages H1-H4 and L1-L4 in the sixth embodiment are the same as the first embodiment. However, the priorities of the signaling messages are not limited in two types. More specifically, after transmitting the signaling messages H1-H4 and L1-L4, the relay node 21 starts to transmit third uplink signaling messages H5, H6 and fourth uplink signaling messages L5 and L6 to the DeNB 23. Similarly, the relay node 21 can firstly filter a S1 or X2 message into the third uplink signaling messages H5 and H6 and fourth uplink signaling messages L5 and L6 with different priorities. The third uplink signaling messages H5 and H6 are the signaling messages with third uplink priority (e.g., lower than first uplink priority but higher than second uplink priority), and the fourth uplink signaling messages L5 and L6 are the signaling messages with fourth uplink priority (e.g., lower uplink priority than second uplink priority).

Afterwards, the transceiver 213 of the relay node 21 transmits the third uplink signaling messages H5 and H6 with third uplink priority to the transceiver 233 of the DeNB 23 via the stream 220a of the first bearer 22a. In other words, the transceiver 233 of the DeNB 23 receives the third uplink signaling messages H5 and H6 with third uplink priority from the transceiver 213 of the relay node 21 via the stream 220a of the first bearer 22a. On the other hand, the transceiver 213 of the relay node 21 transmits the fourth uplink signaling messages L5 and L6 with fourth uplink priority to the transceiver 233 of the DeNB 23 via the stream 220b of the second bearer 22b. In other words, the transceiver 233 of the DeNB 23 receives the fourth uplink signaling messages L5 and L6 with fourth uplink priority from the transceiver 213 of the relay node 21 via the stream 220b of the second bearer 22b.

Then, similarly, the transceiver 233 of the DeNB 23 transmits third downlink signaling messages H7 and H8 with third downlink priority to the transceiver 213 of the relay node 21 via the stream 220a of the first bearer 22a as well. In other words, the transceiver 213 of the relay node 21 receives the third downlink signaling messages H7 and H8 with third downlink priority from the transceiver 233 of the DeNB 23 via the stream 220a of the first bearer 22a. The transceiver 233 of the DeNB 23 transmits fourth downlink signaling messages L7 and L8 with fourth downlink priority to the transceiver 213 of the relay node 21 via the stream 220b of the second bearer 22b as well. In other words, the transceiver 213 of the relay node 21 receives the fourth downlink signaling messages L7 and L8 with fourth downlink priority from the transceiver 233 of the DeNB 23 via the stream 220b of the second bearer 22b.

Accordingly, the priorities of the signaling messages can be various based on the demands of the transmissions.

Figure 8:
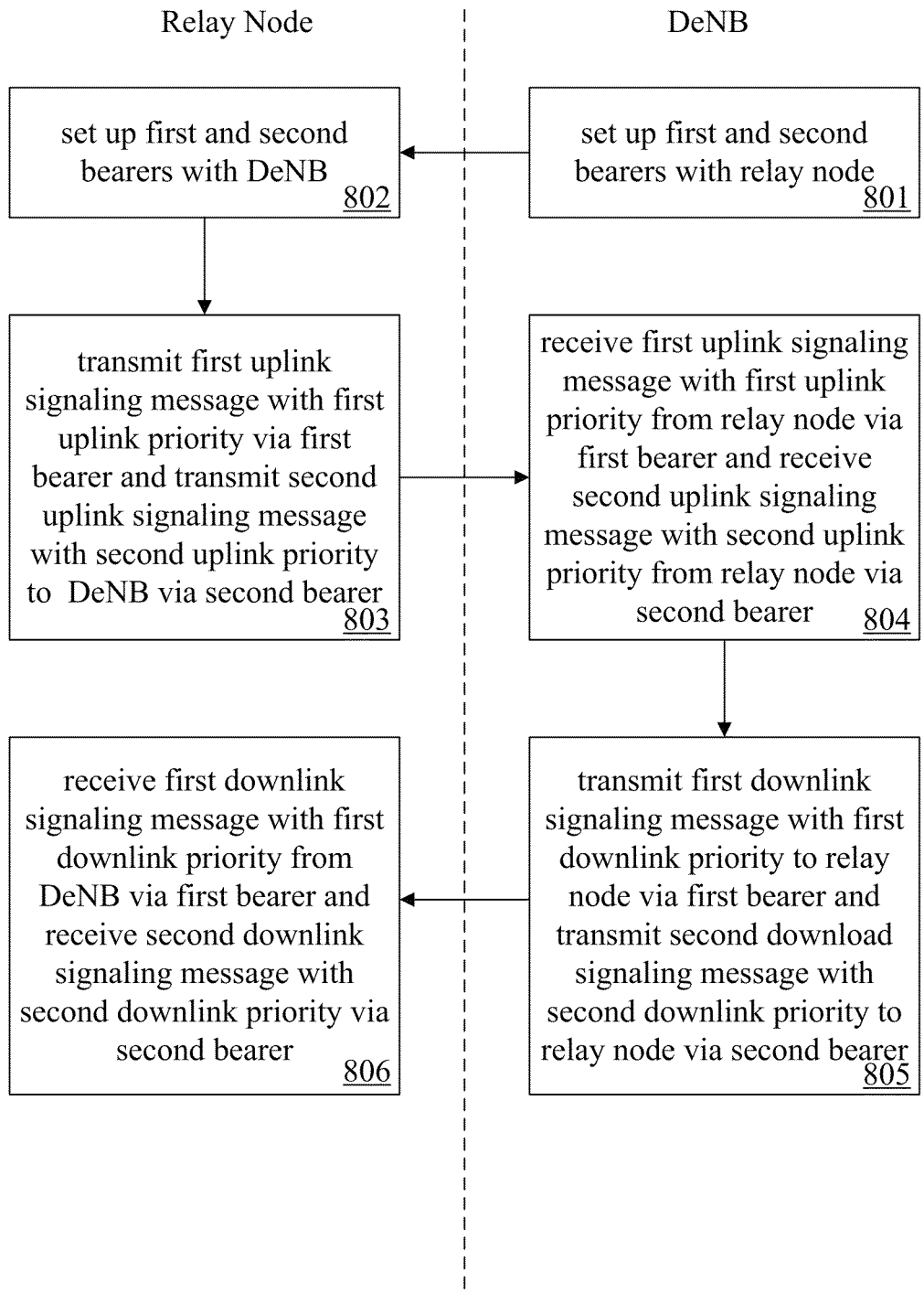
FIG. 8 illustrates the flowchart of a seventh embodiment of the present invention.

A seventh embodiment of the present invention is a communication method for use in a relay node, such as the relay node 31 in the previous embodiments. The relay node is adapted for use in an LTE network. The LTE network comprises the relay node, a DeNB and a back-end network. It should be noted that the back end network can be composed of DeNBs, a core network including mobility management entity (MME) and serving and packet data network gateway (S/P-GW), or an evolved universal terrestrial radio access network (E-UTRAN). The relay node connects with the DeNB wirelessly. FIG. 8 illustrates the flowchart of the seventh embodiment of the present invention.

First, the communication method executes step 801 to enable the DeNB to set up at least two bearers with the relay node. In view of the relay node, step 802 is executed to enable the relay node to set up the at least two bearers with the DeNB. In the seventh embodiment, the at least two bearers comprise a first bearer and a second bearer.

Step 803 is executed to enable the relay node to transmit a first uplink signaling message with first uplink priority via the first bearer and to transmit a second uplink signaling message with second uplink priority to the DeNB via the second bearer. Step 804 is executed to enable the DeNB to receive the first uplink signaling message with first uplink priority from the relay node via the first bearer and to receive the second uplink signaling message with second uplink priority from the relay node via the second bearer.

Then, step 805 is executed to enable the DeNB to transmit a first downlink signaling message with first downlink priority to the relay node via the first bearer and to transmit a second downlink signaling message with second downlink priority to the relay node via the second bearer. Step 806 is executed to enable the relay node to receive the first downlink signaling message with first downlink priority from the DeNB via the first bearer and to receive the second downlink signaling message with second downlink priority via the second bearer.

Therefore, the Head-of-Line blocking problem caused between the relay node and the DeNB can be avoided since the signaling messages can be separately transmitted based on the different priority. Afterwards, the communication method applied in different LTE network environments will be further described in the following embodiments.

Figure 9:
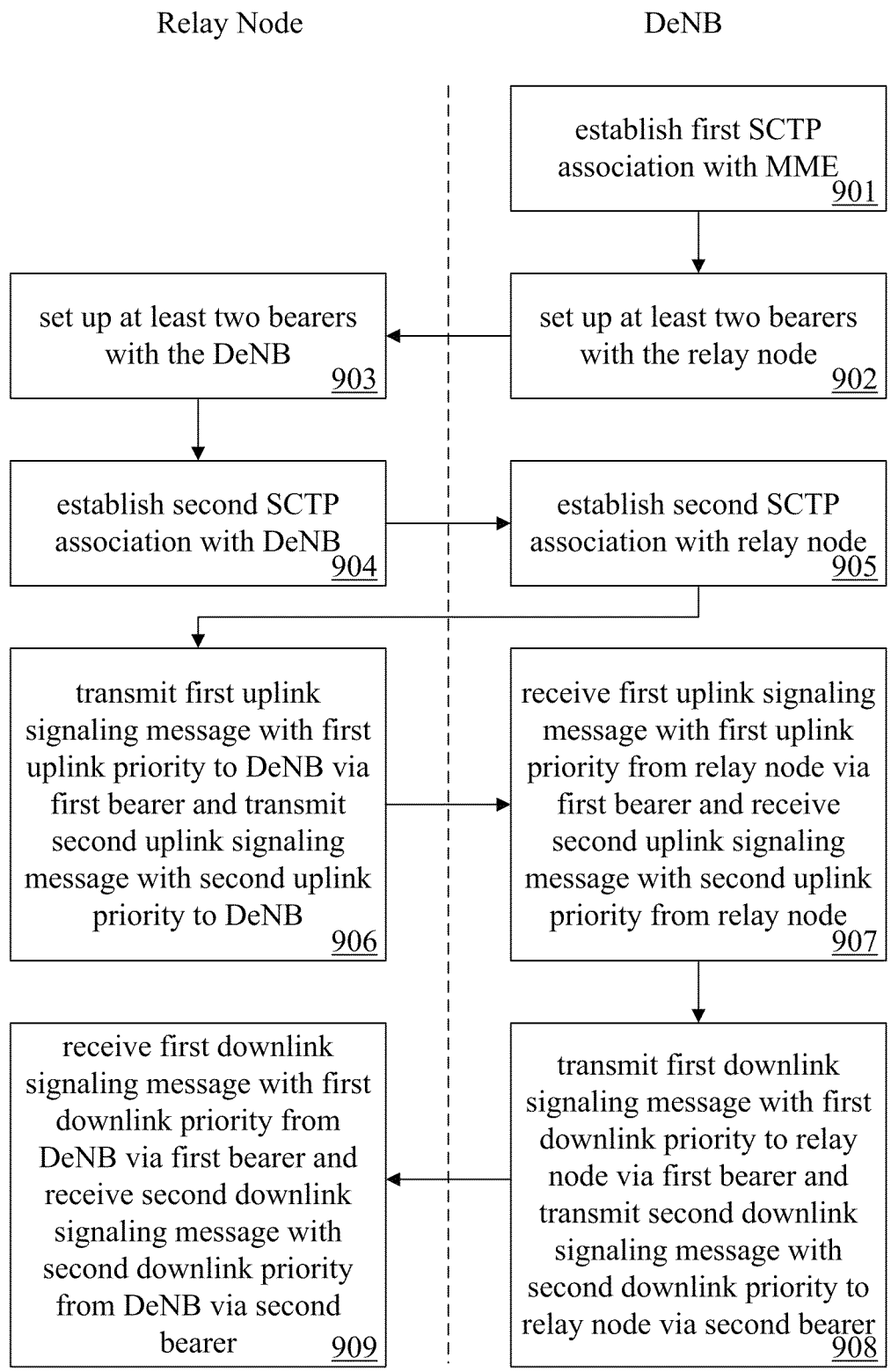
FIG. 9 illustrates the flowchart of an eighth embodiment of the present invention.

An eighth embodiment of the present invention is a communication method for use in a relay node, such as the relay node 31 in the previous embodiments. The relay node is adapted for use in an LTE network. The LTE network comprises the relay node, a DeNB and a core network which includes a MME. The relay node connects with the DeNB wirelessly. A backhaul link is between the DeNB and the MME of the core network. FIG. 9 illustrates the flowchart of the eighth embodiment of the present invention.

First, the communication method executes step 901 to enable the DeNB to establish a first SCTP association with the MME of the core network. Step 902 to enable the DeNB to set up at least two bearers with the relay node. In view of the relay node, step 903 is executed to enable the relay node to set up the at least two bearers with the DeNB. In the eighth embodiment, the at least two bearers comprise a first bearer and a second bearer. Step 904 is executed to enable the relay node to establish a second SCTP association with the DeNB. In view of the DeNB, step 905 is executed to enable the DeNB to establish the second SCTP association with the relay node.

Step 906 is executed to enable the relay node to transmit a first uplink signaling message with first uplink priority to the DeNB via the first bearer and to transmit a second uplink signaling message with second uplink priority to the DeNB. Step 907 is executed to enable the DeNB to receive the first uplink signaling message with first uplink priority from the relay node via the first bearer and to receive the second uplink signaling message with second uplink priority from the relay node via the second bearer.

Then, step 908 is executed to enable the DeNB to transmit a first downlink signaling message with first downlink priority to the relay node via the first bearer and to transmit a second downlink signaling message with second downlink priority to the relay node via the second bearer. Step 909 is executed to enable the relay node to receive the first downlink signaling message with first downlink priority from the DeNB via the first bearer and to receive the second downlink signaling message with second downlink priority from the DeNB via the second bearer.

Figure 10:
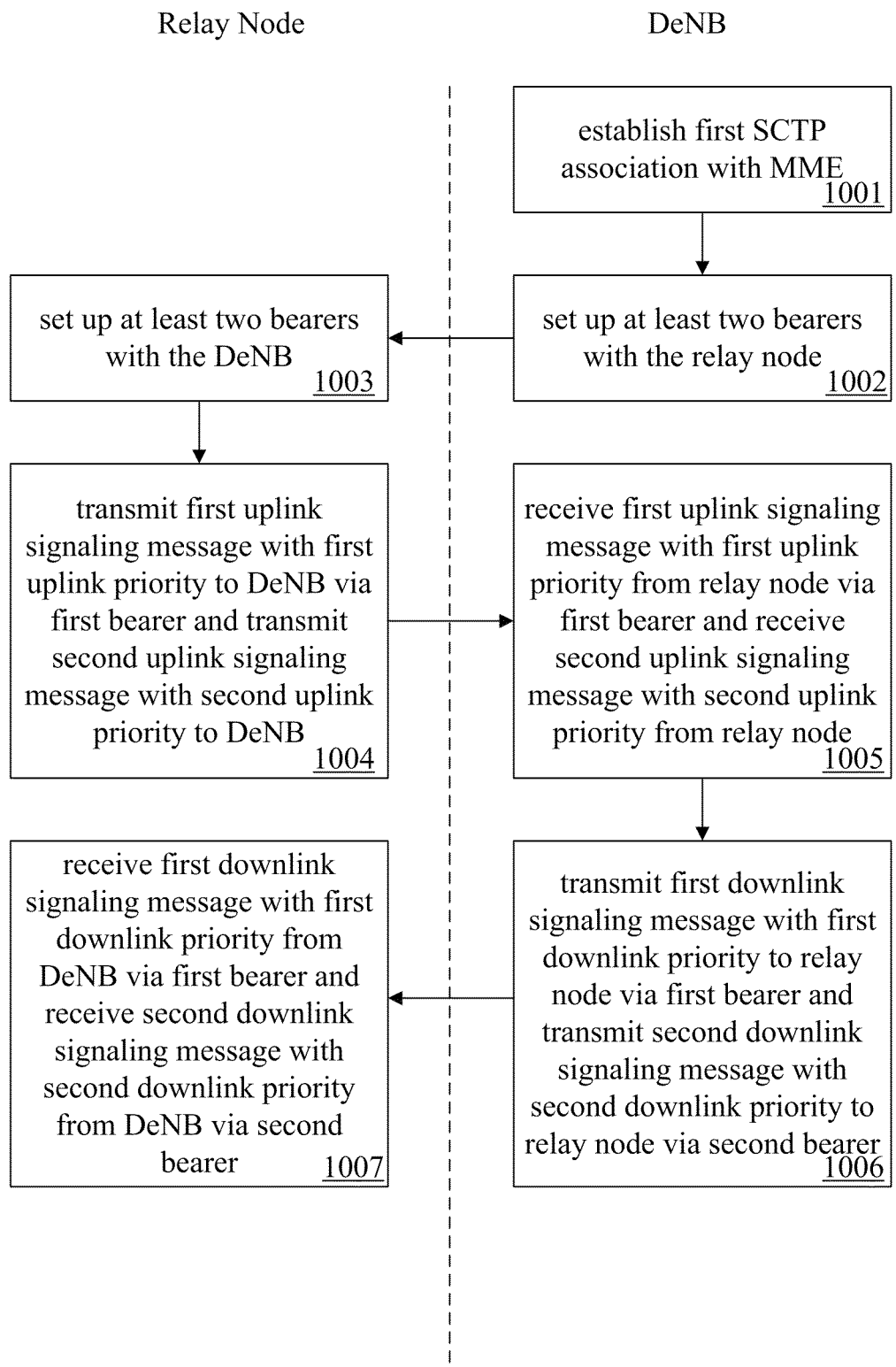
FIG. 10 illustrates the flowchart of a ninth embodiment of the present invention.

A ninth embodiment of the present invention is a communication method for use in a relay node, such as the relay node 31 in the previous embodiments. The relay node is adapted for use in an LTE network. The LTE network comprises the relay node, a DeNB and a core network which includes a MME. The relay node connects with the DeNB wirelessly. A backhaul link is between the DeNB and the MME of the core network. FIG. 10 illustrates the flowchart of the ninth embodiment of the present invention.

First, the communication method executes step 1001 to enable the DeNB to establish a first SCTP association with the MME of the core network. Step 1002 is executed to enable the DeNB to set up at least two bearers with the relay node. In view of the relay node, step 1003 is executed to enable the relay node to set up the at least two bearers with the DeNB. In the ninth embodiment, the at least two bearers, which comprise a first bearer and a second bearer, are established as RRC connections.

Step 1004 is executed to enable the relay node to transmit a first uplink signaling message with first uplink priority to the DeNB via the first bearer and to transmit a second uplink signaling message with second uplink priority to the DeNB via the second bearer. Step 1005 is executed to enable the DeNB to receive the first uplink signaling message with first uplink priority from the relay node via the first bearer and to receive the second uplink signaling message with second uplink priority from the relay node via the second bearer.

Then, step 1006 is executed to enable the DeNB to transmit a first downlink signaling message with first downlink priority to the relay node via the first bearer and to transmit a second downlink signaling message with second downlink priority to the relay node via the second bearer. Step 1007 is executed to enable the relay node to receive the first downlink signaling message with first downlink priority from the DeNB via the first bearer and to receive the second downlink signaling message with second downlink priority from the DeNB via the second bearer.

Figure 11:
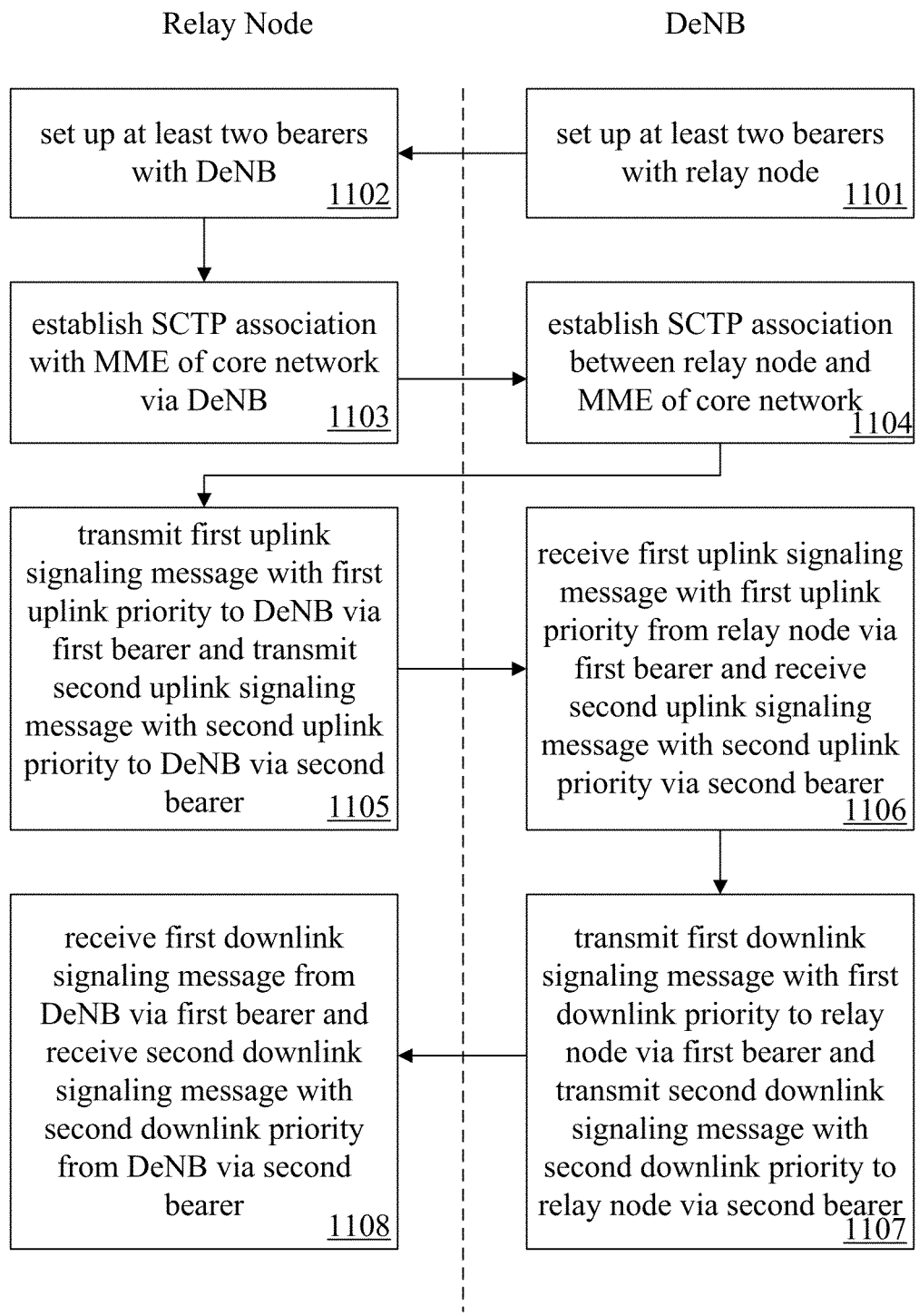
FIG. 11 illustrates the flowchart of a tenth embodiment of the present invention.

A tenth embodiment of the present invention is a communication method for use in a relay node, such as the relay node 31 in the previous embodiments. The relay node is adapted for use in an LTE network. The LTE network comprises the relay node, a DeNB and a core network which includes a MME. The relay node connects with the DeNB wirelessly. A backhaul link is between the DeNB and the MME of the core network. FIG. 11 illustrates the flowchart of the tenth embodiment of the present invention.

First, the communication method executes step 1101 is executed to enable the DeNB to set up at least two bearers with the relay node. In view of the relay node, step 1102 is executed to enable the relay node to set up the at least two bearers with the DeNB. In the tenth embodiment, the at least two bearers comprise a first bearer and a second bearer. Step 1103 is executed to enable the relay node to establish a SCTP association with the MME of the core network via the DeNB. In view of the DeNB, step 1104 is executed to enable the DeNB to establish the SCTP association between the relay node and the MME of the core network.

Step 1105 is executed to enable the relay node to transmit a first uplink signaling message with first uplink priority to the DeNB via the first bearer and to transmit a second uplink signaling message with second uplink priority to the DeNB via the second bearer. Step 1106 is executed to enable the DeNB to receive the first uplink signaling message with first uplink priority from the relay node via the first bearer and to receive the second uplink signaling message with second uplink priority via the second bearer.

Then, step 1107 is executed to enable the DeNB to transmit a first downlink signaling message with first downlink priority to the relay node via the first bearer and to transmit a second downlink signaling message with second downlink priority to the relay node via the second bearer. Step 1108 is executed to enable the relay node to receive the first downlink signaling message from the DeNB via the first bearer and to receive the second downlink signaling message with second downlink priority from the DeNB via the second bearer.

Figure 12:
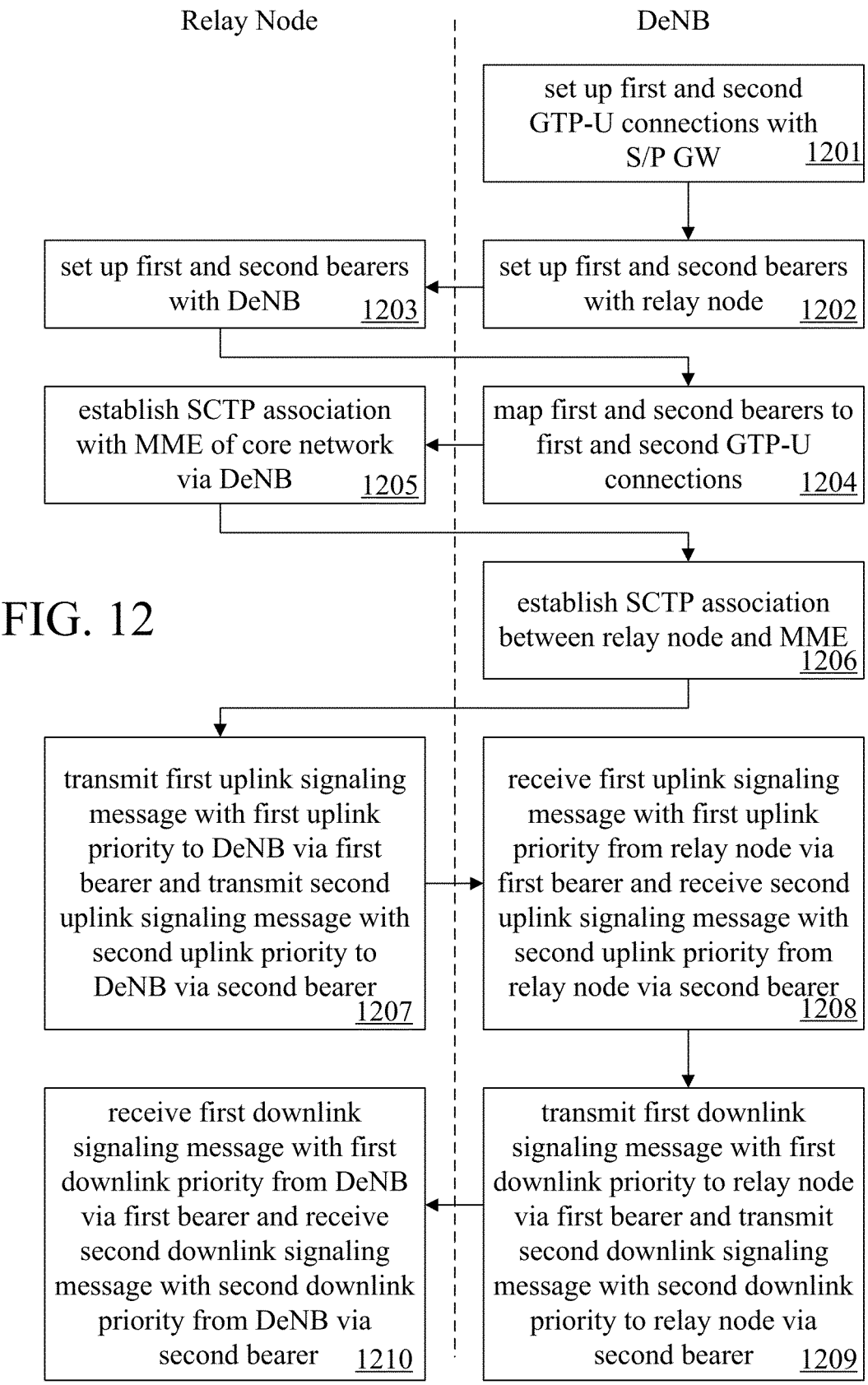
FIG. 12 illustrates the flowchart of an eleventh embodiment of the present invention.

An eleventh embodiment of the present invention is a communication method for use in a relay node, such as the relay node 31 in the previous embodiments. The relay node is adapted for use in an LTE network. The LTE network comprises the relay node, a DeNB and a core network which includes an MME and an S/P-GW. The relay node connects with the DeNB wirelessly. A backhaul link is between the DeNB and the core network. FIG. 12 illustrates the flowchart of the eleventh embodiment of the present invention.

First, step 1201 is executed to enable the DeNB to set up at least two GTP-U connections with the S/P-GW of the core network. In the eleventh embodiment, the at least two GTP-U connections comprise a first GTP-U connection and a second GTP-U connection. Step 1202 is executed to enable the DeNB to set up at least two bearers with the relay node. In view of the relay node, step 1203 is executed to enable the relay node to set up the at least two bearers with the DeNB. In the eleventh embodiment, the at least two bearers comprise a first bearer and a second bearer which are correspond to the first GTP-U connection and second GTP-U connection respectively. Step 1204 is executed to enable the DeNB to map the first and second bearers to the first and second GTP-U connections respectively.

Then, step 1205 is executed to enable the relay node to establish a SCTP association with the MME of the core network via the DeNB. In view of the DeNB, step 1206 is executed to enable the DeNB to establish the SCTP association between the relay node and the MME of the core network. Step 1207 is executed to enable the relay node to transmit a first uplink signaling message with first uplink priority to the DeNB via the first bearer and to transmit a second uplink signaling message with second uplink priority to the DeNB via the second bearer. Step 1208 is executed to enable the DeNB to receive the first uplink signaling message with first uplink priority from the relay node via the first bearer and to receive the second uplink signaling message with second uplink priority from the relay node via the second bearer.

Then, step 1209 is executed to enable the DeNB to transmit a first downlink signaling message with first downlink priority to the relay node via the first bearer and to transmit a second downlink signaling message with second downlink priority to the relay node via the second bearer. Step 1210 is executed to enable the relay node to receive the first downlink signaling message with first downlink priority from the DeNB via the first bearer and to receive the second downlink signaling message with second downlink priority from the DeNB via the second bearer.

Figure 13A:
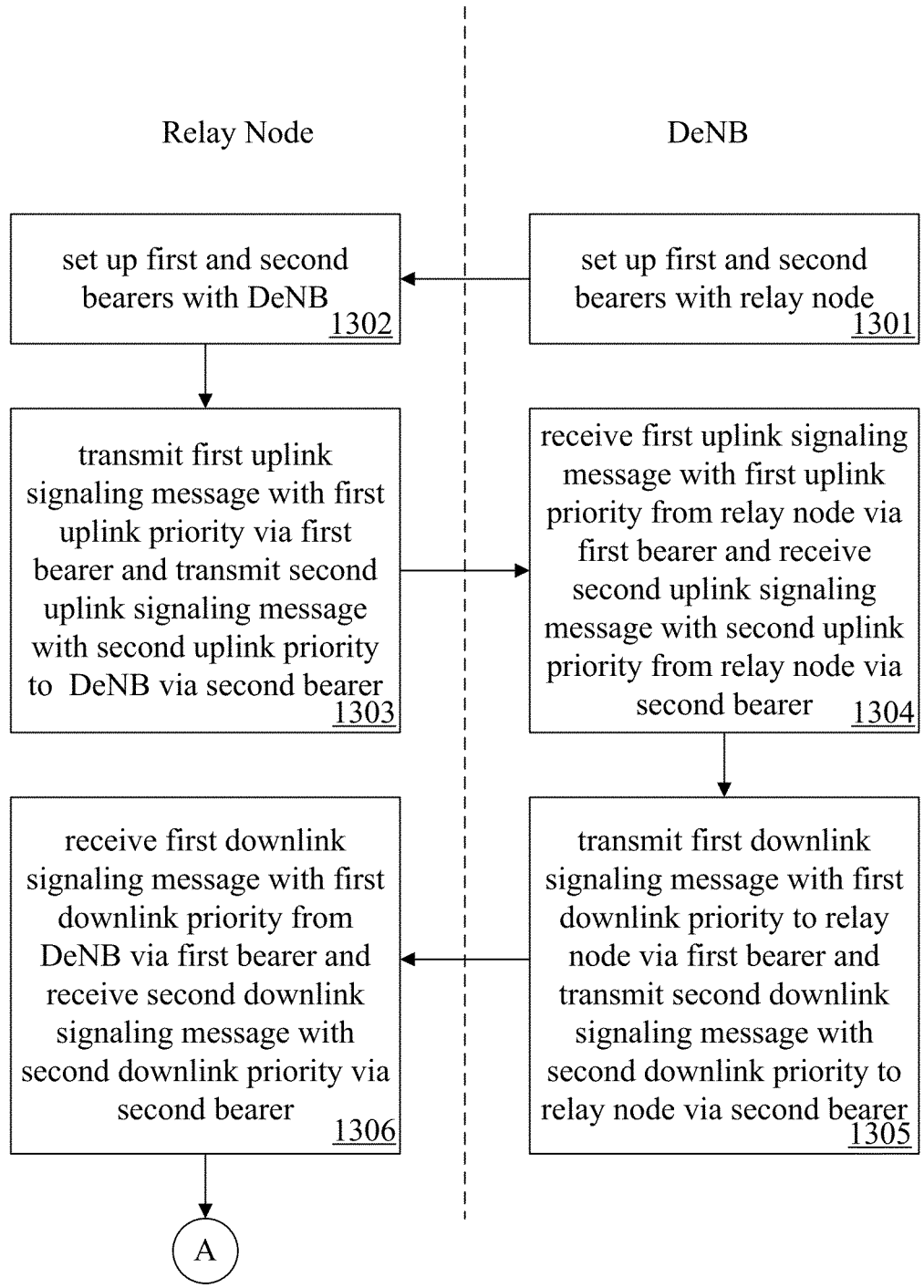
FIGS. 13A-13B illustrate the flowchart of a twelfth embodiment of the present invention.
Figure 13B:
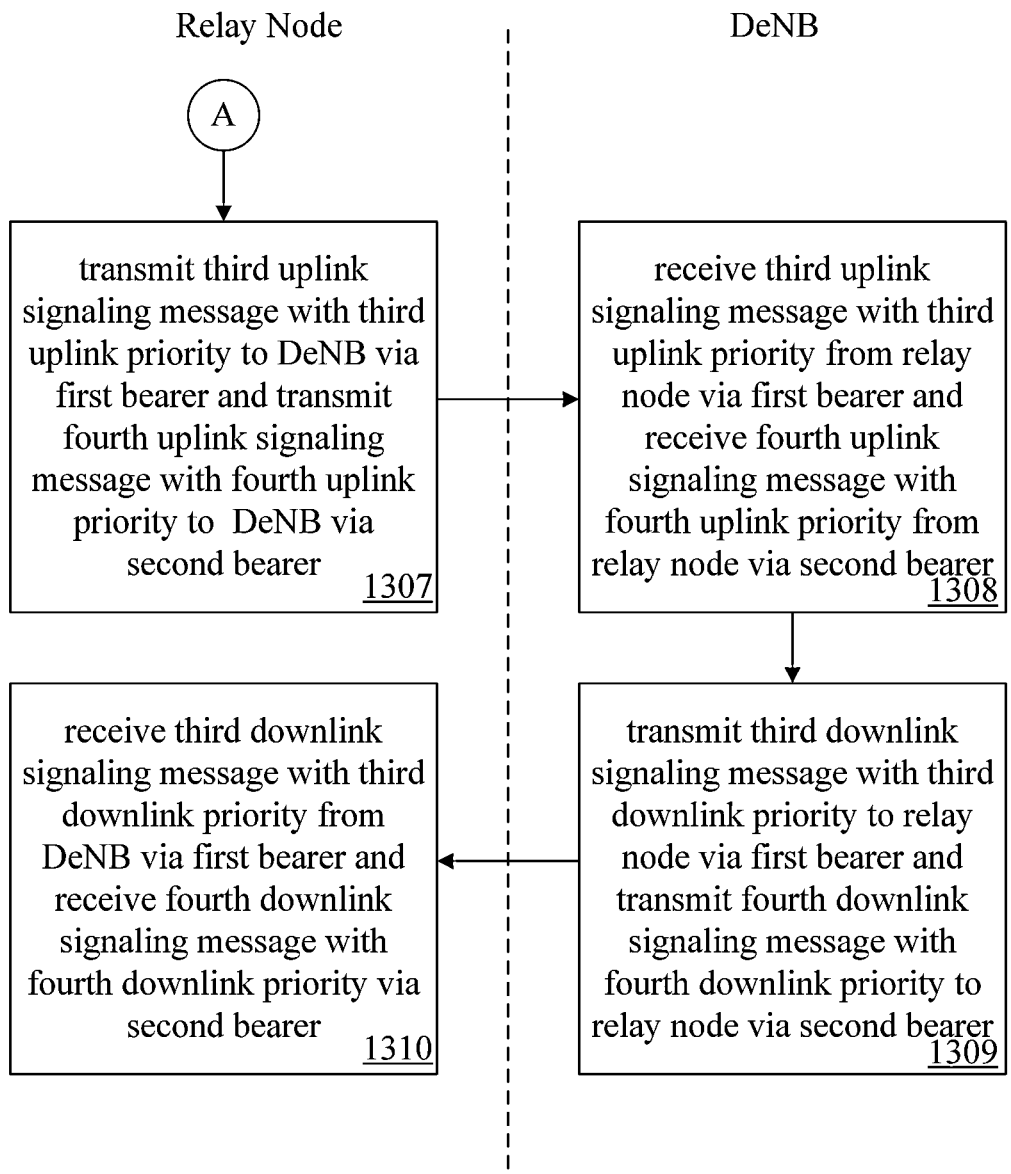

A twelfth embodiment of the present invention is a communication method for use in a relay node, such as the relay node 31 in the previous embodiments. The relay node is adapted for use in an LTE network. The LTE network comprises the relay node, a DeNB and a back-end network. It should be noted that the back end network can be composed of an evolved NodeB (eNB), a core network including mobility management entity (MME) and serving and packet data network gateway (S/P-GW), or an evolved universal terrestrial radio access network (E-UTRAN). The relay node connects with the DeNB wirelessly. FIGS. 13A-13B illustrate the flowchart of the twelfth embodiment of the present invention.

First, the communication method executes step 1301 to enable the DeNB to set up at least two bearers with the relay node. In view of the relay node, step 1302 is executed to enable the relay node to set up the at least two bearers with the DeNB. In the twelfth embodiment, the at least two bearers comprise a first bearer and a second bearer.

Step 1303 is executed to enable the relay node to transmit a first uplink signaling message with first uplink priority via the first bearer and to transmit a second uplink signaling message with second uplink priority to the DeNB via the second bearer. Step 1304 is executed to enable the DeNB to receive the first uplink signaling message with first uplink priority from the relay node via the first bearer and to receive the second uplink signaling message with second uplink priority from the relay node via the second bearer.

Then, step 1305 is executed to enable the DeNB to transmit a first downlink signaling message with first downlink priority to the relay node via the first bearer and to transmit a second downlink signaling message with second downlink priority to the relay node via the second bearer. Step 1306 is executed to enable the relay node to receive the first downlink signaling message with first downlink priority from the DeNB via the first bearer and to receive the second downlink signaling message with second downlink priority via the second bearer.

Step 1307 is executed to enable the relay node to transmit a third uplink signaling message with third uplink priority to the DeNB via the first bearer and to transmit a fourth uplink signaling message with fourth uplink priority to the DeNB via the second bearer. Step 1308 is executed to enable the DeNB to receive the third uplink signaling message with third uplink priority from the relay node via the first bearer and to receive the fourth uplink signaling message with fourth uplink priority from the relay node via the second bearer.

Then, step 1309 is executed to enable the DeNB to transmit a third downlink signaling message with third downlink priority to the relay node via the first bearer and to transmit a fourth downlink signaling message with fourth downlink priority to the relay node via the second bearer. Step 1310 is executed to enable the relay node to receive the third downlink signaling message with third downlink priority from the DeNB via the first bearer and to receive the fourth downlink signaling message with fourth downlink priority via the second bearer.

As described above, the HOL blocking problems caused among the relay node, the DeNB, the eNB, and the core network can be avoided. Accordingly, the signaling message transmission is efficient in an LTE network according to the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication method for a relay node, the relay node being adapted for use in a long-term evolution (LTE) network, the LTE network comprising the relay node and a donor evolved NodeB (DeNB), the relay node connecting with the DeNB wirelessly, the communication method comprising the following steps of:
   (a) enabling the relay node to set up at least two bearers with the DeNB, wherein the at least two bearers comprise a first bearer and a second bearer;
   (b) enabling the relay node to transmit a first uplink signaling message with first uplink priority to the DeNB via the first bearer and to transmit a second uplink signaling message with second uplink priority to the DeNB via the second bearer; and
   (c) enabling the relay node to receive a first downlink signaling message with first downlink priority from the DeNB via the first bearer and to receive a second downlink signaling message with second downlink priority from the DeNB via the second bearer, wherein both of the first uplink signaling message and the second uplink signaling message will be transmitted by the relay node via the first bearer and the second bearer without being queued in the event that each of the first uplink signaling message and the second uplink signaling message have different priorities.

2. The communication method as claimed in claim 1, further comprising the following steps:
   (d) enabling the relay node to transmit a third uplink signaling message with third uplink priority to the DeNB via the first bearer, and to transmit a fourth uplink signaling message with fourth uplink priority to the DeNB via the second bearer; and
   (e) enabling the relay node to receive a third downlink signaling message with third downlink priority from the DeNB via the first bearer, and to receive a fourth downlink signaling message with fourth downlink priority from the DeNB via the second bearer.

3. The communication method as claimed in claim 1, wherein the LTE network further comprises a core network which include a mobility management entity (MME), a backhaul link is between the DeNB and the MME of the core network, the DeNB connects with the MME of the core network based on a first stream control transmission protocol (SCTP) association, and the communication method further comprises the following step after step (a):
   (a1) enabling the relay node to establish a second SCTP association with the DeNB;
   wherein the at least two bearers are within the second SCTP association.

4. The communication method as claimed in claim 1, wherein the LTE network further comprises a core network which include a mobility management entity (MME), a backhaul link is between the DeNB and the MME of the core network, the DeNB connects with the MME of the core network based on a stream control transmission protocol (SCTP) association, and the at least two bearers are radio resource control (RRC) connections.

5. The communication method as claimed in claim 1, wherein the LTE network further comprises a core network which include a mobility management entity (MME), a backhaul link is between the DeNB and the MME of the core network, and the communication method further comprises the following step after step (a):
   (a1) enabling the relay node to establish a stream control transmission protocol (SCTP) association with the MME of the core network via the DeNB;
   wherein the at least two bearers are within the SCTP association.

6. The communication method as claimed in claim 5, wherein the core network further comprises a serving and packet data network gateway (S/P-GW), the DeNB connects with the S/P-GW via at least two GPRS tunneling protocol for user plane (GTP-U) connections, and the at least two GTP-U connections comprises a first GTP-U connection and a second GTP-U connection which are corresponding to the first bearer and the second bearer respectively.

7. A relay node for use in a long-term evolution (LTE) network, the LTE network comprising the relay node and a donor evolved NodeB (DeNB), the relay node connecting with the DeNB wirelessly, the relay node comprising:
   a processing unit being configured to set up at least two bearers with the DeNB, wherein the at least two bearers comprise a first bearer and a second bearer; and
   a transceiver being configured to transmit a first uplink signaling message with first uplink priority to the DeNB via the first bearer, to transmit a second uplink signaling message with second uplink priority to the DeNB via the second bearer, to receive a first downlink singling message with first downlink priority from the DeNB via the first bearer, and to receive a second downlink signaling message with second downlink priority from the DeNB via the second bearer,
   wherein both of the first uplink signaling message and the second uplink signaling message are transmitted by the relay node via the first bearer and the second bearer without being queued in the event that each of the first uplink signaling message and the second uplink signaling message have different priorities.

8. The relay node as claimed in claim 7, wherein the transceiver is further configured to transmit a third uplink signaling message with third uplink priority to the DeNB, to transmit a fourth uplink signaling message with fourth uplink priority to the DeNB, to receive a third downlink signaling message with third downlink priority from the DeNB via the first bearer, and to receive a fourth downlink signaling message with fourth downlink priority from the DeNB via the second bearer.

9. The relay node as claimed in claim 7, wherein the LTE network further comprises a core network which include a mobility management entity (MME), a backhaul link is between the DeNB and the MME of the core network, the DeNB connects with the MME of the core network based on a first stream control transmission protocol (SCTP) association, and the processing unit is further configured to establish a second SCTP association with the DeNB so that the at least two bearers are within the second SCTP association.

10. The relay node as claimed in claim 7, wherein the LTE network further comprises a core network which include a mobility management entity (MME), a backhaul link is between the DeNB and the MME of the core network, the DeNB connects with the MME of the core network based on a stream control transmission protocol (SCTP) association, and the at least two bearers are radio resource control (RRC) connections.

11. The relay node as claimed in claim 7, wherein the LTE network further comprises a core network which include a mobility management entity (MME), a backhaul link is between the DeNB and the MME of the core network, and the processing unit is further configured to establish a stream control transmission protocol (SCTP) association with the MME of the core network via the DeNB so that the at least two bearers are within the SCTP association.

12. The relay node as claimed in claim 11, wherein the core network further comprises a serving and packet data network gateway (S/P-GW), the DeNB connects with the S/P-GW via at least two GPRS tunneling protocol for user plane (GTP-U) connections, and the at least two GTP-U connections comprises a first GTP-U connection and a second GTP-U connection which are corresponding to the first bearer and the second bearer respectively.

13. A communication method for a donor evolved NodeB (DeNB), the DeNB being adapted for use in a long-term evolution (LTE) network, the LTE network comprising a relay node and the DeNB, the relay node connecting with the DeNB wirelessly, the communication method comprising the steps of:
(a) enabling the DeNB to set up at least two bearers with the relay node, wherein the at least two bearers comprise a first bearer and a second bearer;
(b) enabling the DeNB to receive a first uplink signaling message with first uplink priority from the relay node via the first bearer and to receive a second uplink signaling message with second uplink priority from the relay node via the second bearer; and
(c) enabling the DeNB to transmit a first downlink signaling message with first downlink priority to the relay node via the first bearer and to transmit a second downlink signaling message with second downlink priority to the relay node via the second bearer, wherein both of the first uplink signaling message and the second uplink signaling message will be transmitted by the relay node via the first bearer and the second bearer without being queued in the event that each of the first uplink signaling message and the second uplink signaling message have different priorities.

14. The communication method as claimed in claim 13, further comprising the steps:
(d) enabling the DeNB to receive a third uplink signaling message with third uplink priority from the relay node via the first bearer and to receive a fourth uplink signaling message with fourth uplink priority from the relay node via the second bearer; and
(e) enabling the DeNB to transmit a third downlink signaling message with third downlink priority to the relay node via the first bearer and to transmit a fourth downlink signaling message with fourth downlink priority to the relay node via the second bearer.

15. The communication method as claimed in claim 13, wherein the LTE network further comprises a core network which include a mobility management entity (MME), a backhaul link is between the DeNB and the MME of the core network, and the communication method further comprises the following step before step (a):
(a1) enabling the DeNB to establish a first stream control transmission protocol (SCTP) association with the MME of the core network.

16. The communication method as claimed in claim 15, further comprising the following step after step (a):
(a2) enabling the DeNB to establish a second SCTP association with the relay node;
wherein the at least two bearers are within the second SCTP association.

17. The communication method as claimed in claim 15, wherein the at least two bearers are radio resource control (RRC) connections.

18. The communication method as claimed in claim 13, wherein the LTE network further comprises a core network which includes a mobility management entity (MME), a backhaul link is between the DeNB and the MME of the core network, and the communication method further comprises the following step before step (a):
(a1) enabling the DeNB to establish a stream control transmission protocol (SCTP) association between the relay node and the MME of the core network;
wherein the at least two bearers are within the SCTP association.

19. The communication method as claimed in claim 18, wherein the core network further comprises a serving and packet data network gateway (S/P-GW), the backhaul link is between the DeNB and the MME and the S/P-GW of the core network, and the communication method further comprises the following step after step (a):
(a1) enabling the DeNB to set up at least two GPRS tunneling protocol for user plane (GTP-U) connections with the S/P-GW within the SCTP association, wherein the at least two GTP-U connections comprises a first GTP-U connection and a second GTP-U connection; and
(a2) enabling the DeNB to map the first bearer to the first GTP-U connection, and to map the second bearer to the second GTP-U connection.

20. A donor evolved NodeB (DeNB) for use in a long-term evolution (LTE) network, the LTE network comprising a relay node and the DeNB, the relay node connecting with the DeNB wirelessly, the DeNB comprising:
a processing unit being configured to set up at least two bearers with the relay node, wherein the at least two bearers comprise a first bearer and a second bearer;

a transceiver being configured to receive a first uplink signaling message with first uplink priority from the relay node via the first bearer, to receive a second uplink signaling message with second uplink priority from the relay node via the second bearer, to transmit a first downlink signaling message with first downlink priority to the relay node via the first bearer; and to transmit a second downlink signaling message with second downlink priority to the relay node via the second bearer, wherein both of the first uplink signaling message and the second uplink signaling message are transmitted by the relay node via the first bearer and the second bearer without being queued in the event that each of the first uplink signaling message and the second uplink signaling message have different priorities.

21. The DeNB as claimed in claim 20, wherein the transceiver is further configured to receive a third uplink signaling message with third uplink priority from the relay node via the first bearer, to receive a fourth uplink signaling message with fourth uplink priority from the relay node via the second bearer, to transmit a third downlink signaling message with third downlink priority to the relay node via the first bearer, and further configured, and to transmit a fourth downlink signaling message with fourth downlink priority to the relay node via the second bearer.

22. The DeNB as claimed in claim 20, wherein the LTE network further comprises a core network which include a mobility management entity (MME), a backhaul link is between the DeNB and the MME of the core network, the processing unit is further configured to establish a first stream control transmission protocol (SCTP) association with the MME of the core network.

23. The DeNB as claimed in claim 22, wherein the processing unit is further configured to establish a second SCTP association with the relay node so that the at least two bearers are within the second SCTP association.

24. The DeNB as claimed in claim 22, wherein the at least two bearers are radio resource control (RRC) connections.

25. The DeNB as claimed in claim 20, wherein the LTE network further comprises a core network which includes a mobility management entity (MME), a backhaul link is between the DeNB and the MME of the core net work, the processing unit is further configured to establish a stream control transmission protocol (SCTP) association between the relay node and the MME of the core network so that the at least two bearers are within the SCTP association.

26. The DeNB as claimed in claim 25, wherein the core network further comprises a serving and packet data network gateway (S/P-GW), the backhaul link is between the DeNB and the MME and the S/P-GW of the core network, the processing unit is further configured to set up at least two GPRS tunneling protocol for user plane (GTP-U) connections which comprise a first GTP-U connection and a second GTP-U connection, with the S/P-GW within the SCTP association, to map the first bearer to the first GTP-U connection, and to map the second bearer to the second GTP-U connection.

* * * * *